US 11,461,298 B1

United States Patent
Shemmer et al.

(10) Patent No.: US 11,461,298 B1
(45) Date of Patent: Oct. 4, 2022

(54) SCORING PARAMETER GENERATION FOR IDENTITY RESOLUTION

(71) Applicant: ActionIQ, Inc., New York, NY (US)

(72) Inventors: Benjamin Shemmer, Brooklyn, NY (US); Nitay Joffe, New Rochelle, NY (US)

(73) Assignee: ACTIONIQ, INC., New York, NY (US)

( * ) Notice: Subject to any disclaimer, the term of this patent is extended or adjusted under 35 U.S.C. 154(b) by 0 days.

(21) Appl. No.: 17/407,559

(22) Filed: Aug. 20, 2021

(51) Int. Cl.
*G06F 16/00* (2019.01)
*G06F 16/215* (2019.01)
*G06F 17/11* (2006.01)
*G06F 16/2458* (2019.01)

(52) U.S. Cl.
CPC ........ *G06F 16/215* (2019.01); *G06F 16/2462* (2019.01); *G06F 17/11* (2013.01)

(58) Field of Classification Search
None
See application file for complete search history.

*Primary Examiner* — Bai D Vu
(74) *Attorney, Agent, or Firm* — Butzel Long

(57) ABSTRACT

Systems and techniques are provided for scoring parameter generation for identity resolution. A second data set that has a statistical profile that matches a statistical profile of a third data set may be generated from a first data set. The first data set, the second data set, and the third data set may include records that comprise data about individuals. Identity resolution scores generated for the first data set may be matched to pairs of records from the second data set. New scoring parameters may be generated from the second data set and the identity resolution scores matched to the pairs of records from the second data set using regression. Identity resolution scores for pairs of records from the third data set may be generated using the new scoring parameters.

21 Claims, 16 Drawing Sheets

FIG. 5

Table 501:

| Record ID | Email Address | Name |
|---|---|---|
| 1 | hwead@xyz.com | Heather Zead |
| 2 | tps2@zxy.edu | Edward Yavine |
| 3 | hwead@xyz.com | Heather Zeed |
| 4 | onretep@xyk.com | 672320 |
| 5 | dyavine@zxy.edu | Edward Yavine |
| 6 | kerngergeg | Tom Porgan |
| 7 | | Gary Fritan |

Table 502:

| Email Address Invalid | Name Invalid |
|---|---|
| 33.33% | 16.66% |

FIG. 6

| Record ID | Email Address Match | Email Address Close | Name Match | Name Close | Record #1 | Record #2 | Score |
|---|---|---|---|---|---|---|---|
| 1 | 0 | 0 | 0 | 0 | 1 | 2 | 0 |
| 2 | 1 | 0 | 0 | 1 | 1 | 3 | 0.9 |
| 3 | 0 | 0 | 0 | 0 | 1 | 4 | 0 |
| 4 | 0 | 0 | 0 | 0 | 1 | 5 | 0 |
| 5 | 0 | 0 | 0 | 0 | 1 | 6 | 0 |
| 6 | 0 | 0 | 0 | 0 | 1 | 7 | 0 |
| 7 | 0 | 0 | 0 | 0 | 2 | 3 | 0 |
| 8 | 0 | 0 | 0 | 0 | 2 | 4 | 0 |
| 9 | 0 | 0 | 1 | 0 | 2 | 5 | 0.6 |
| 10 | 0 | 0 | 0 | 0 | 2 | 6 | 0 |
| 11 | 0 | 0 | 0 | 0 | 2 | 7 | 0 |
| 12 | 0 | 0 | 0 | 0 | 3 | 4 | 0 |
| 13 | 0 | 0 | 0 | 0 | 3 | 5 | 0 |
| 14 | 0 | 0 | 0 | 0 | 3 | 6 | 0 |
| 15 | 0 | 0 | 0 | 0 | 3 | 7 | 0 |
| 16 | 0 | 0 | 0 | 0 | 4 | 5 | 0 |
| 17 | 0 | 0 | 0 | 0 | 4 | 6 | 0 |
| 18 | 0 | 0 | 0 | 0 | 4 | 7 | 0 |
| 19 | 0 | 0 | 0 | 0 | 5 | 6 | 0 |
| 20 | 0 | 0 | 0 | 0 | 5 | 7 | 0 |
| 21 | 0 | 0 | 0 | 0 | 6 | 7 | 0 |

601

| Record ID | Email Address | Name |
|---|---|---|
| 1 | hwead@xyz.com | Heather Zead |
| 2 | tps2@zxy.edu | Edward Yavine |
| 3 | hwead@xyz.com | Heather Zeed |
| 4 | onretep@xyk.com | 672320 |
| 5 | dyavine@zxy.edu | Edward Yavine |
| 6 | kerngergeg | ~~Tom Porgan~~ |
| 7 | | Gary Fritan |

801

| Email Address Invalid | Name Invalid |
|---|---|
| 33.33% | 33.33% |

| Record ID | Email Address Match | Email Address Close | Name Match | Name Close | Record #1 | Record #2 | Score |
|---|---|---|---|---|---|---|---|
| 1 | 0 | 0 | 0 | 0 | 1 | 2 | 0 |
| 2 | 1 | 0 | 0 | 1 | 1 | 3 | 0.9 |
| 3 | 0 | 0 | 0 | 0 | 1 | 4 | 0 |
| 4 | 0 | 0 | 0 | 0 | 1 | 5 | 0 |
| 5 | 0 | 0 | 0 | 0 | 1 | 6 | 0 |
| 6 | 0 | 0 | 0 | 0 | 2 | 3 | 0 |
| 7 | 0 | 0 | 1 | 0 | 2 | 4 | 0 |
| 8 | 0 | 0 | 0 | 1 | 2 | 5 | 0.6 |
| 9 | 0 | 0 | 0 | 0 | 2 | 6 | 0 |
| 10 | 0 | 0 | 0 | 0 | 3 | 4 | 0 |
| 11 | 0 | 0 | 0 | 0 | 3 | 5 | 0 |
| 12 | 0 | 0 | 0 | 0 | 3 | 6 | 0 |
| 13 | 0 | 0 | 0 | 0 | 4 | 5 | 0 |
| 14 | 0 | 0 | 0 | 0 | 4 | 6 | 0 |
| 15 | 0 | 0 | 0 | 0 | 5 | 6 | 0 |

SCORING PARAMETER GENERATION FOR IDENTITY RESOLUTION

BACKGROUND

Identity resolution may be used to reconcile and combine data about individuals both within and across databases by identifying records that include data about the same individual. The data sets of records stored in any database on which identity resolution is performed may be incomplete, as records may be missing data that may be useful in determining which individuals the records store data about and may also store data that is invalid. Various techniques may be used to determine when two records store data about the same individual. These techniques may be computationally inefficient, inaccurate, use unsupervised techniques that may not be able leverage available supervised data, and/or require high levels of human intervention.

BRIEF SUMMARY

According to implementations of the disclosed subject matter, a second data set that has a statistical profile that matches a statistical profile of a third data set may be generated from a first data set. The first data set, the second data set, and the third data set may include records that comprise data about individuals. Identity resolution scores generated for the first data set may be matched to pairs of records from the second data set. New scoring parameters may be generated from the second data set and the identity resolution scores matched to the pairs of records from the second data set using regression. Identity resolution scores for pairs of records from the third data set may be generated using the new scoring parameters.

Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 5 shows example tables suitable for scoring parameter generation for identity resolution according to an implementation of the disclosed subject matter.

FIG. 6 shows an example table suitable for scoring parameter generation for identity resolution according to an implementation of the disclosed subject matter.

FIG. 8A shows example tables suitable for scoring parameter generation for identity resolution according to an implementation of the disclosed subject matter.

DETAILED DESCRIPTION

Figure 1:
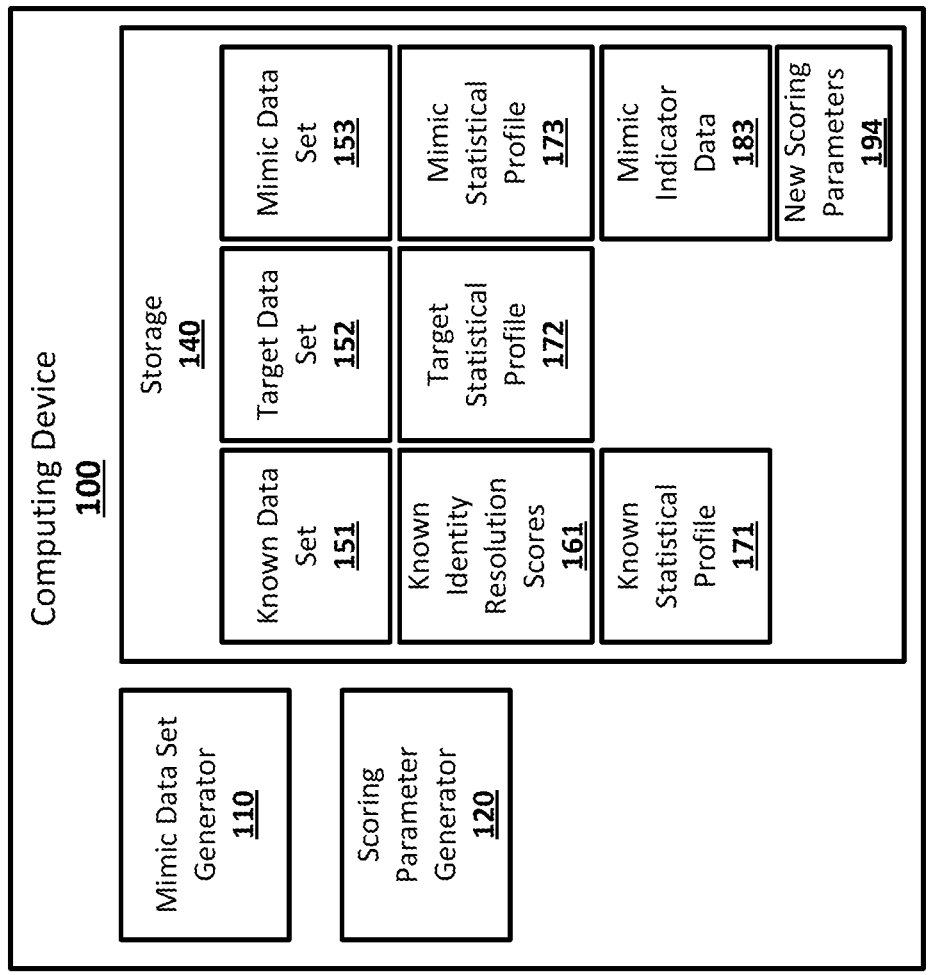
FIG. 1 shows an example system suitable for scoring parameter generation for identity resolution according to an implementation of the disclosed subject matter.

According to embodiments disclosed herein, scoring parameter generation for identity resolution may allow for generation of scoring parameters that may be used to perform identity resolution on a data set. Identity resolution scores may be generated for data in a known data set using known scoring parameters. The known data set may be modified to mimic the statistical profile of a target data set, generating a mimic data set. The identity resolution scores generated for data in the known data set may be used with the mimic data set to generate new scoring parameters. The new scoring parameters may be used to generate identity resolution scores for the target data set. Supervised data may be used in the generation of the new scoring parameters, instead of generating the new scoring parameters using unsupervised techniques.

A data set may include records which may be stored in a single database or may be stored across multiple databases. Identity resolution may be used to determine which records from a data set store data about the same individual. An individual may be, for example, a person, or may be a business, organization, or other entity. For example, records, from the same database or different databases, that store data about the same individual may store different data about that individual, such as, for example, different email addresses, phone numbers, spelling of names, names if the individuals name has changed or the individual uses nicknames or aliases, and physical addresses, and some records for an individual may store data about the individual that is not stored in other records for that individual. Records about the same individual may be stored in any number of databases, and any database may have multiple records that store data about the same individual.

Identity resolution may be used to determine whether two records store data about the same individual even when data between the records differs. Pairs of records from a data set that includes data from any number of databases may be scored using a scoring equation, with the identity resolution score generated for a pair of records indicating a likelihood that the pair of records store data about the same individual, for example. An identity resolution score may be, for example, a matching probability. Identity resolution scores may be generated using any suitable scoring equation. For example, the scoring equation used for scoring a pair of records may be:

$$P(\text{match})=1-P_a \times P_b \times P_c \times \ldots P_z \quad (1)$$

where P(match) may be the identity resolution score for a pair of records from a data set, the scoring parameters $P_a \ldots P_z$ may be penalty factors for a set of features $f=\{a \ldots z \ldots\}$, with each of the features in the set of features f being a feature that may be used to identify an individual from a record. The features used in equation (1) may be taken from, for example, the labels of columns of records in a data set or may be otherwise based on the type of data stored in those columns. The penalty factor for a feature may be applied to the score for a pair of records when the values stored for the feature differs between the two records by more than some threshold amount for that feature. For example, the set of features f may include features of "name", "email address", and "phone number", and $P_{name}$, $P_{email}$, $P_{phone}$ may be penalty factors that are applied to the identity resolution score for a pair of records when the values for the "name", "email address", or "phone number", respectively, differ by more than the threshold amount for the respective feature between the two records being scored. For example, $P_{name}$ may be applied to the scoring of a pair of records when the data stored in the "name" column of the two records differs by more than a threshold amount for names, for example, with enough different letters to infer that the names stored in the two records are different and not variants or misspellings of each other. The penalty factors may be, for example, values greater than 0 and less than 1. A pair of records may be determined to store data about the same individual when the identity resolution score for the pair of records exceeds a threshold score, which may be set to any suitable value.

When records in a data set have been determined to store data about the same individual during identity resolution, the records may be combined and stored in a resolved database as a single record, or may otherwise be modified to indicate that they store data about the same individual. This may be done on a pairwise basis based on the identity resolution scores generated for each pair of records in the data set. More than two records may be combined, or otherwise modified to indicate that they store data about the same individual, for example, when the identity resolution score for a first record and second record indicate that they store data for the same individual, and the identity resolution score for the first record and a third record, and/or the second record and the third record, indicate that they store data for the same individual.

Identity resolution scores may be generated for data in a known data set using known scoring parameters. For example, the identity resolution scores may be generated according to equation (1) using a set of known scoring parameters. The known scoring parameters may be penalty factors for use with equation (1) that may have been determined to accurately score the known data set, which may have previously had identity resolution performed on it. The identity resolution previously performed on the known data set may have resulted in a resolved database which may have been evaluated and determined to be accurate, for example, correctly identifying records that store data about the same individual with few false positives and false negatives. The evaluation of the resolved database to determine the accuracy of the identity resolution may have been performed in any suitable manner. The known data set may be considered to be supervised data, as the results of performing identity resolution on the known data set may have already been evaluated, and records in the known data set may, for example, include a column that may be used to indicate that the records are matched. In some implementations, the identity resolution scores generated for the known data set during identity resolution may be stored, for example, as part of the resolved database, as part of the records in the databases of the known data set, in a separate database that may include records which associate identity resolution scores with records in the databases of the known data set, or as a metadata for the known data set. This may obviate the need to generate the identity resolution scores for the known data set using the known scoring parameters again, as the identity resolution scores may be read from the location in which they are already stored.

The known data set may be modified to mimic the statistical profile of a target data set. Modifying the known data set to mimic the target data set may generate a mimic data set. A target data set may be a data set that is intended to have identity resolution performed on it. The records in the target data set may be from any number of databases. The records in the target data set may be entirely different from the records in the known data set, or may have some level of intersection or overlap, for example, having some records in common, without the target data set being identical to the known data set. The target data set may have a different statistical profile than the known data set. The statistical profile for a data set may be a measure of the percentages of invalid data within the records of the data set based on the number of columns of records in the data set that include invalid data for that column based on the feature represented by the column, or include no data or null data, and the number of unique examples of valid data for that column included in columns across all records in the data set. For example, if a record stores a phone number in a column for email addresses, the record may have invalid data in that column. If three records in a column for email addresses store the same valid email address, only the one occurrence of the email address and one instance of the column may be counted when determining the percentage of invalid data in the column for email addresses, rather than counting all three occurrences of the email address and all three instances of the column. A percentage of invalid data may be determined for each column the known data set and the target data. The statistical profile for the target data set may include all of the percentages determined for the columns of the target data set, and the statistical profile for the known data set may include all of the percentages determined for the columns of the known data set. The known data set and the target data set may, for example, have all their columns in common, having the same number of columns with the same labels and storing the same types of data.

To generate a mimic data set that mimics the target data set from the known data, the known data set may be modified until it has a statistical profile that matches the statistical profile of the target data set. Statistical profiles for two data sets may match when the percentages of invalid data for each column is the same, or within some threshold percentage, between the two data sets. For example, the known data set may be modified until the percentage of invalid data in each column of the known data set matches, or is within some threshold percentage of, the percentage of invalid data in the column for the same feature in the target data set. For example, the target data set may include columns for the features of "email address", "phone number", "name", and "physical address", with percentages of invalid data of, respectively, 20%, 60%, 10%, and 20%. The known data set may include columns for the features of "email address", "phone number", "name", and "physical address", with percentages of invalid data of, respectively, 15%, 50%, 50%, and 15%. The known data set may be modified until the percentages of invalid data for columns for the features of "email address", "phone number", "name", and "physical address" are within, for example, 5% of the percentages of invalid data of 20%, 60%, 10%, and 20% for those columns in the target data set.

To modify the known data set to mimic the target data set, generating the mimic data set, valid data may be removed from columns of records of the known data set and individual records with invalid data may be removed from the known data set. Removing valid data from columns of records of the known data set may increase the percentage of invalid data for that column within the known data set. Removing individual records that have at least some columns with invalid data may decrease the percentage of invalid data within the known data set for the columns that had invalid data in the removed record, although the percentage of invalid data may increase for any columns for which the removed record had valid data. To remove an instance of valid data from columns of records of the known data set, every occurrence of the valid data may be removed. For example, if a valid email address that appears in the email address column of three records of the known data set is to be removed, the valid email address may be removed from the email address column of all three records that include the valid email address. Removing valid data from a column of a record of the known data set may be accomplished by, for example, deleting the data in the column of the record and leaving the column of the record empty, or replacing the data in the column of the record with a null value. Removing a record from the known data set may be accomplished by deleting the entire record, or row, from the known data set so that the record does not appear in the mimic data set. When a record is removed from the known data set, the record to be removed may be selected at random from among all records in the known data set that have invalid data in a column whose percentage of invalid data needs to be decreased.

The known data set may be modified in an iterative manner to generate a mimic data set that mimics that target data set. The statistical profile of the known data set may be compared to the statistical profile of the target data set to determine which direction the percentages of invalid data in the columns of the known data set need to be adjusted in to match the percentages of invalid data in the target data set. Based on the directions in which the percentages of invalid data in the columns of the known data set need to be adjusted in order to match the statistical profile of the target data set, either the percentage of invalid data in a single column may be increased through the removal of a single instance of valid data, or the percentage of valid data in any number of columns may be increased through the removal of a single record with invalid data. After modification of the known data set through the removal of either the instance of valid data or the single record, the statistical profile of the modified known data set may be redetermined and compared to the statistical profile of the target data set to determine if the percentages of invalid data in the columns of the modified known data set and the target data set are the same or are within a threshold percentage of each other. If the percentages of invalid data in the columns of the modified known data set and the target data set are not the same and are not within a threshold percentage of each other, the modified known data set may be further modified, as the statistical profiles may not yet match. Either the percentage of invalid data in a single column may be increased through the removal of a single instance of valid data, or the percentage of valid data in any number of columns may be increased through the removal of a single record with invalid data in those columns, again based on the directions in which the percentages of invalid data in the columns of the known data set need to be adjusted in order to have the statistical profile of the modified known data set match the statistical profile of the target data set. This may be repeated until the known data set has been modified so that the percentages of invalid data in the columns of the modified known data set and the target data set are the same or are within a threshold percentage of each other, meaning the statistical profiles match. The modified known data set may then be stored as the mimic data set.

For example, the target data set may include columns for the features of "email address", "phone number", "name", and "physical address", with percentages of invalid data of, respectively, 20%, 60%, 10%, and 20%. The known data set may include columns for the features of "email address", "phone number", "name", and "physical address", with percentages of invalid data of, respectively, 15%, 50%, 50%, and 15%. The initial modification to the known data set may be the removal of a single instance of a valid email address from the email address column of records of the known data set. This may increase the percentage of invalid data in the email address column of the known data set from 15% to 18%. The percentages of invalid data in the columns of the known data set may then be 18%, 50%, 50%, and 15%, each of which may not be within 5% of the percentages of invalid data in the columns of the target data set, indicating that the known data set should be modified further. A single instance of a valid physical address may be removed from the physical address column of records of the known data set. This may increase the percentage of invalid data in the physical address column of the records of the known data set from 15% to 20%. The percentages of invalid data in the columns of the known data set may then be 18%, 50%, 50%, and 20%, three of which may not be within 5% of the percentages of invalid data in the columns of the target data set, indicating that the known data set should be modified further. A single record with invalid data in its name column may be removed from the known data set. This may decrease the invalid data percentage in the name column of the known data set from 50% to 40%. The percentages of invalid data in the columns of the known data set may then be 18%, 50%, 40%, and 20%, three of which may not be within 5% of the percentages of invalid data in the columns of the target data set, indicating that the known data set should be modified further. Modifications to the known data set may continue iteratively until the percentages of invalid data in the columns of the known data set are within 5% of the percentages of invalid data in the columns of the target data set. For example, after additional modifications to the known data set, the percentages of invalid data in the columns of the known data set may be 19%, 58%, 10%, and 20%, all of which may be within 5% of the percentages of invalid data of 20%, 60%, 10%, and 20% in the columns of the target data set. The modified known data set may be saved as a mimic data set that may mimic the target data set.

The modification made to the known data set at each iteration of the modification of the known data set may be selected in any suitable manner. For example, modifications may be selected according to any suitable implementation of hill climbing or simulated annealing.

Modification of the known data set to generate the mimic data set may be performed on a copy of the known data set, or may otherwise be performed in a non-destructive or reversible manner so as to not permanently alter the composition of the known data set when generating the mimic data set. The mimic data set may, for example, be stored separately from the known set. If the known data set is already a copy of a data set stored elsewhere, modifications may be made directly to the known data set.

The identity resolution scores generated for data in the known data set may be used with the mimic data set to generate new scoring parameters. Pairs of records from the mimic data set may be prepared so that they can be scored according to equation (1) in the same manner that pairs of records of the known data set were scored according to equation (1) to generate the identity resolution scores for the known data set. For example, indicator data may be generated for each pair of records from the mimic data set. The indicator data for a pair of records may indicate whether, for each column for the same feature in the pair of records, the data in the column either matches or does not differ by more than the threshold amount for the features of the column. The indicator data for a pair of records may be, for example, a record storing binary values in a number of columns that is double the number of columns in each of the pair of records.

For example, if the pair of records have columns for the features of "email address", "phone number", "name", and "physical address", the indicator data for the pair of records may have columns representing whether the email addresses are close, whether the email addresses match, whether the phone numbers are close, whether the phone numbers match, whether the names are close, whether the names match, whether the physical addresses are close, and whether the physical addresses match. If, for example, the email addresses are the same between the pair of records, the indicator data for the pair of records may have a value of "1" in the column that indicates whether the email addresses match and a "0" in the column that indicates whether the email addresses are close. Similarly, if the email addresses in a pair of records do not match, but do not differ by more than the threshold amount for email addresses, the indicator data for the pair of records may have a value of "0" in the column that indicates whether the email addresses match and a "1" in the column that indicates whether the email addresses are close. If the email addresses in a pair of records do not match and differ by more than the threshold amount for email addresses, the indicator data for the pair of records may have a "0" in both the column that indicates whether the email addresses match and the column that indicates whether the email addresses are close. The indicator data may also include a column that may store a "1" when the email addresses do not match and are not close, and a "0" otherwise, or the indicator data may not have such a column, but the value of such as column may be inferred from the values of the columns that indicate whether the email addresses match or are close.

Indicator data may be generated for every unique pair of records in the mimic data set. The pairs of records from the mimic data set may be identical to, or a subset of, the pairs of records from the known data set that were scored using equation (1) to generate the identity resolution scores for the known data set. The pairs of records for the mimic data set may be a subset of the pairs of records from the known data set when, for example, a record was removed from the known data set when the known data set was modified to generate the mimic data set.

Regression may be used on the identity resolution scores for the known data set and indicator data for the mimic data set to generate new scoring parameters. The identity resolution scores for the known data set may include an identity resolution score for each unique pair of records from the known data set. The identity resolution scores for the pairs of records from the known data set may be matched with the indicator data for the same pairs of records from the mimic data set, as each record in the mimic data set may correspond to a record in the known data set. There may be fewer of pairs of records from the mimic data set than from the known data set, as some records may have been removed during modification of the known data set, so not all of the identity resolutions scores for the known data set may be matched with records in the indicator data for the mimic data set. Regression may be performed across all of the indicator data for pairs of records from the mimic data set and their matching identity resolution scores from the known data set to determine penalty factors for equation (1) that would've generated the identity resolution scores that match, or are similar to, the identity resolution scores that were generated for the known data set if the mimic data set had been used instead of the known data set. The regression may generate scoring parameters, in the form of, for example, penalty factors, that may then be used to generated accurate identity resolution scores on a data set that has the statistical profile of the target data set.

Regression may be performed in any suitable manner. For example, equation (1) may be rewritten and log transformed according to:

$$(1-P(\text{match})) = P_a \times P_b \times P_c \times \ldots P_z \qquad (2)$$

$$\log(1-P(\text{match})) = \log(P_a) + \log(P_b) + \log(P_c) + \ldots \log(P_z) \qquad (3)$$

In some implementations, some of the scoring parameters may have preassigned, or hardcoded, values, and may not be determined through regression. Equation (3) may be further divided through by the product of any of the scoring parameters that have preassigned values according to:

$$(\log(1-P(\text{match})))/(\Pi_{hardcoded}P) = (\log(P_a) + \log(P_b) + \log(P_c) + \ldots \log(P_z))/(\Pi_{hardcoded}P) \qquad (4)$$

The transformation of equation (1) to equation (4) may allow for regression to be performed, as equation (1) may not be in a suitable form for regression without being transformed. Every pair of records from the mimic data set may be used with equation (4) along with the identity resolution score taken from the known data set and matched with the indicator data for the pair of records as P(match), and which penalty factors are used may be determined based on the indicator data for the pair of records, where a penalty factor $P_i$ for a feature i is applied when indicator data $X_i$ has a value of 1 and does not apply when the indicator data $X_i$ has a value of 0. For example, if $P_{email}$ is the penalty factor for the feature of email address, ($P_{email}$) may remain in equation (1) for a pair of records if the indicator data for that pair of records has a value of 0 in for both "email address matches" or "email address close", implying a value of 1 for "email address else", and may not used with equation (4), for example, by removing $P_{email}$ from the right side of equation (4), if the value for either "email address matches" or "email address close" is 1. Equation (4) may be completed once for each pair of records from the mimic data set, including dividing through by penalty factors with hardcoded values, according to equations. Any suitable form of regression may be used on equation (4) in order to fit the dependent variable on the left side of equation (4), which may be identity resolution scores transformed according to $(\log(1-P(match)))/(\Pi_{hardcoded}P)$, by determining values for the independent variables, which may be the penalty factors. The data set for the right side of equation (4), to be used in regression, may be the indicator data that indicates whether or not a particular penalty factor applies to the determination of a particular identity resolution scores. The result of the regression may be values for any of the scoring parameters, for example, penalty factors, that do not have hardcoded values and appear in equation (4) for at least one of the records. The values generated through the use of regression may be stored as new scoring parameters.

The new scoring parameters may be used to generate identity resolution scores for data in the target data set. The new scoring parameters may be applied to the target data set according to equation (1), generating identity resolution scores, as P(match), for every pair of records in the target data set. For example, indicator data may be generated for the target data set in the same manner as indicator data was generated for the mimic data set. The indicator data may be used with equation (1) to generate an identity resolution score for each unique pair of records from target data set. Because the new scoring parameters were generated using identity resolution scores for the known data set, which are known to be accurate, and the mimic data set, which was modified from the known data set to have the same statistical profile as the target data set, the new scoring parameters may generate accurate identity resolution scores for the pairs of records from the target data set without requiring human adjustment of scoring parameters, and without using the scoring parameters that were used to generate identity resolution scores for the known data set, avoiding overfitting of the scoring parameters while still allowing for the new scoring parameters to be generated quickly. The identity resolution scores generated for the target data set may be used in any suitable manner. For example, pairs of records from the target data set with an identity resolution that is over a threshold score may be considered to be records that store data for the same individual and may be merged into a single record or otherwise marked to indicate that they are records for the same individual. Combining records of the target data set according to identity resolution scores may reduce the size of the target data set, resulting in less storage space being needed to store the target data set, less network bandwidth being needed to transmit the target data set, and less processing time and memory being needed to perform operations with the target data set, while resulting in the records of the target data set including more complete data about individuals. Generating new scoring parameters according to embodiments disclosed herein may allow new scoring parameters to be generated faster and more efficiently than otherwise, and without levels of human intervention otherwise needed. This may allow for more target data sets to have scoring parameters generated for them in any given amount of time and with any given amount of computational resources.

Performance measures may be taken during the entire process of generating the mimic data set and performing regression to generate the new scoring parameters. Regression to generate the new scoring parameters may be initially be performed using a standard least squares regression on the indicator data for pairs of records from the mimic data set and their matching identity resolution scores for the known data set. After the new scoring parameters are generated, any range of model metrics, such as, for example, lift and Area Under the Curve (AUC), that compare newly generated scores with existing edges may be applied to the new scoring parameters. Basic statistics may also be calculated for the new scoring parameters using the prior score threshold, which may be a privileged point in the Receiver Operating Characteristics (ROC) curve. Metrics that may be used to measure how reasonable the new scoring parameters are may also be calculated. The metrics may check the inclusion of the new scoring parameters within known ranges determined from statistically and demographically similar datasets. These metrics may include a shrinkage metric, which may be determined according to:

$$1-(\#old\ profiles/\#new\ profiles) \quad (5)$$

The metrics may also include a decay metric, which may be the exponent on a power law fit to the log of the distribution of component size across the unique individuals determined to be in the known data set. The component size for a unique individual may represent the number of records determined to be for that unique individual. For example, a unique individual from the known data for whom it was determined there are three records in the known data set would have a component size of three. "#old profiles" may be the number of unique individuals determined to be in the known data set based on the merging of records according to the identity resolution scores for the known data set generated with the original scoring parameters used for the known data set, and "#new profiles" may be the number of unique individuals determined to be in the known data set based on the merging of records according to identity resolution scores generated with the new scoring parameters generated based on the regression performed with the mimic data set and identity resolution scores for the known data set. An acceptable value for shrinkage may be, for example, between 0.1 and 0.2. An acceptable value for decay may be, for example, between −0.5 and −1.5.

FIG. 1 shows an example system suitable for scoring parameter generation for identity resolution according to an implementation of the disclosed subject matter. A computing device 100 may include a mimic data set generator 110, a scoring parameter generator 120, and storage 140. The computing device 100 may be any suitable device, such as, for example, a computer 20 as described in FIG. 13, for implementing the mimic data set generator 110, the scoring parameter generator 120, and the storage 140. The computing device 100 may be a single computing device, or may include multiple connected computing devices, and may be, for example, a laptop, a desktop, an individual server, a server farm, or a distributed server system, or may be a virtual computing device or system. The computing device 100 may be part of a computing system and network infrastructure, or may be otherwise connected to the computing system and network infrastructure. The mimic data set generator 110 may be any suitable combination of hardware and software for generating a mimic data set that mimics a target data set. The scoring parameter generator 120 may be any suitable combination of hardware and software for generating new scoring parameters from a data set and identity resolution scores through regression. The storage 140 may be any suitable combination of hardware and software for implementing any suitable combination of volatile and non-volatile storage, which may store data sets, identity resolution scores, indicator data, and scoring parameters.

The mimic data set generator 110 may be any suitable combination of hardware and software for generating a mimic data set that mimics a target data set. The mimic data set generator 110 may make iterative modifications to an input data set, removing records from the input data set and removing values from columns of records of the input data set, until the input data set has a statistical profile that matches the statistical profile of a target data set, generating from the input data set a mimic data set that mimics the target data set. The statistical profile of a data set may include the percentages of invalid data included in each column of the data set. The statistical profile of two data sets may match when the percentages of invalid data in each column in common between the two data sets are the same or within some threshold percentage of each other. Columns may be in common between two data sets when the when the columns store data for the same feature, for example, having the same label or a label that can be considered the same, in each data set. To generate the mimic data set through modification of the input data set, the mimic data set generator 110 may redetermine the statistical profile of the input data set after each iterative modification to the input data set, and then compare the redetermined statistical profile to the statistical profile of the target data set to determine if they match. The mimic data set generator 110 may continue to iteratively modify the input data set and determine the statistical profile for the modified input data set until the statistical profile of the modified input data set matches the statistical profile of the target data set.

The scoring parameter generator 120 may be any suitable combination of hardware and software for may be any suitable combination of hardware and software for generating new scoring parameters from a data set and identity resolution scores through regression. The scoring parameter generator 120 may, for example, generate indicator data for pairs of records from a mimic data set and perform regression using identity resolution scores matched to the indicator data along with the indicator data to generate new scoring parameters. The new scoring parameters may be, for example, penalty factors as used in equation (1). The scoring parameter generator 120 may use any suitable form of regression, including any suitable linear regression, to generate the new scoring parameters.

The storage 140 may be any suitable storage hardware connected to the computing device 100. For example, the storage 140 may be a component of the computing device, such as a magnetic disk, flash memory module or solid state disk, or may be connected to the computing device 100 through any suitable wired or wireless connection. The storage 140 may be a local storage, i.e., within the environment within which the computing device 100 operates, or may be partially or entirely operated on a remote server. The storage 140 may store a known data set 151, a target data set 152, a mimic data set 153, known identity resolution scores 161, known statistical profile 171, target statistical profile 172, mimic statistical profile 174, and mimic indicator data 183.

The known data set 151 may be a data set of records about individuals and on which identity resolution has already been performed, generating the known identity resolution scores 161. The known identity resolutions scores 161 may be stored separately from the known data set 151, or may be, for example, stored as a column of indicator data for the known data set 151 or metadata for the known data set 151. The records in the known data set 151 may be about any suitable type of individuals, such as, for example, persons, businesses, and organization, and may include any suitable data about the individuals, such as, for example, names or other identifiers for the individuals, demographic data about the individual, and any form of contact information for the individual, such as email addresses, phone numbers, and physical addresses. The known identity resolution scores 161 may be identity resolution scores generated for the known data set 151 based on indicator data for pairs of records from the known data set 151. An identity resolution score for a pair of records may be an indication of the likelihood that the pair of records include data about the same individual. The known identity resolution scores 151 may have been generated according to, for example, equation (1), using scoring parameters for the known data set 151. The known identity resolution scores 161 may be considered accurate and their accuracy may have been evaluated in any suitable manner. The known statistical profile 171 may be a statistical profile of the known data set 151, and may, for example, include percentages of invalid data in each column of the known data set 151.

The target data set 152 may be a data set of records about individuals. The records in the target data set 152 may be about any suitable type of individuals, such as, for example, persons, businesses, and organization, and may include any suitable data about the individuals, such as, for example, names or other identifiers for the individuals, demographic data about the individual, and any form of contact information for the individual, such as email addresses, phone numbers, and physical addresses. The target data set 152 may be a data set on which identity resolution will be performed, and for which new scoring parameters will be generated by the scoring parameter generator 120. The target statistical profile 172 may be a statistical profile of the target data set 152, and may, for example, include percentages of invalid data in each column of the target data set 152.

The mimic data set 153 may be a data set of records about individuals. The mimic data set 153 may be generated by modifying of the known data set 151 through removal of some valid data from columns of records of the known data set 151 and removal of some records with invalid data. For example, the mimic data set generator 110 may modify the known data set 151 until the modified version of the known data set 151 has a statistical profile that matches the target statistical profile 172. The mimic statistical profile 173 may be the statistical profile of the mimic data set 153. The mimic statistical profile 173 may be determined from the mimic data set 153 after every modification made to the known data set 151 by the mimic data set generator 110. The mimic data set generator 110 may stop making modifications to the known data set 151 once the mimic statistical profile 173 matches the target statistical profile 172, for example, having percentages of invalid data in the columns in the mimic data set 153 that are the same as, or within a threshold percentage of, the percentages of invalid data in the counterpart columns in the target data set 152.

Figure 2:
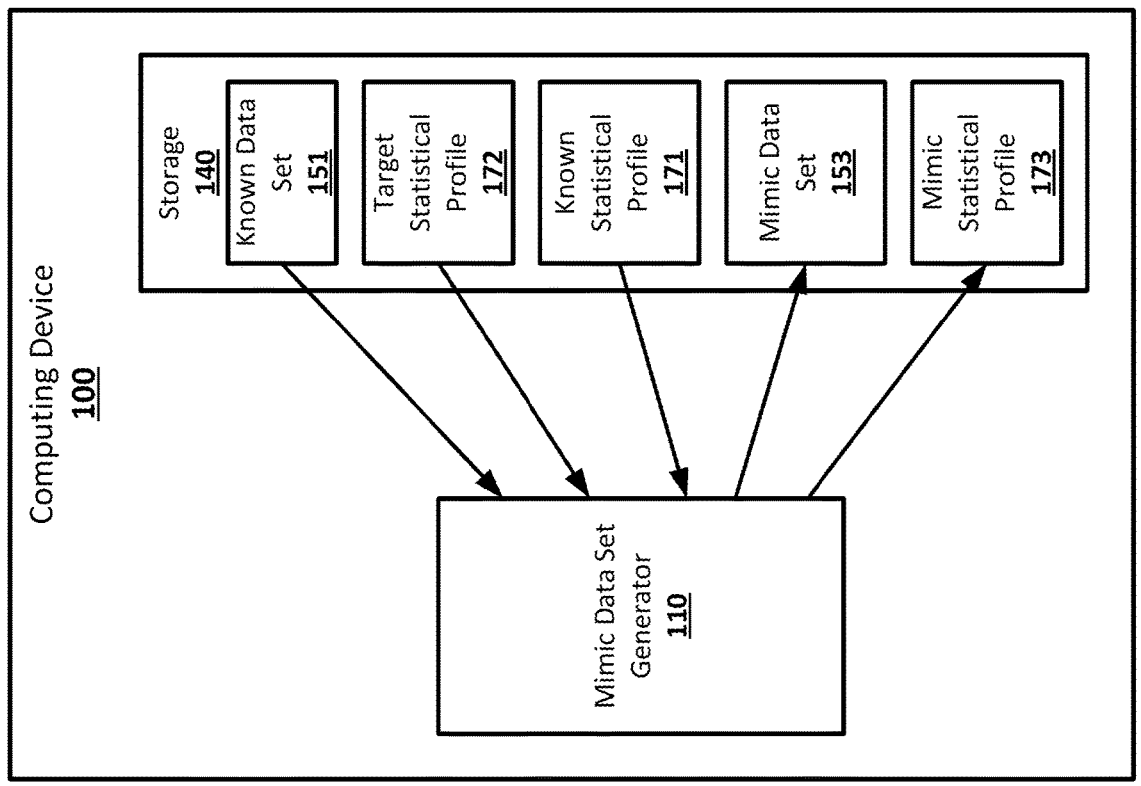
FIG. 2 shows an example arrangement suitable for scoring parameter generation for identity resolution according to an implementation of the disclosed subject matter.

FIG. 2 shows an example arrangement suitable for scoring parameter generation for identity resolution according to an implementation of the disclosed subject matter. The mimic data set generator 110 may generate the mimic data set 153. For example, the mimic data set generator 110 may receive as input the known data set 151, the target statistical profile 172, and the known statistical profile 171. The mimic data set generator 110 may compare the target statistical profile 172 and the known statistical profile 171 to determine the differences between the percentages of invalid data in the columns common to the known data set 151 and the target data set 152. Based on the differences, the mimic data set generator 110 may determine the first modification to make to the known data set 151 to generate the mimic data set 153, generating a modified version of the known data set 151. For example, the mimic data set generator 110 may determine that a unique example of valid data needs to be removed from the same column in the records of the known data set 151, or that a record that includes invalid data in a particular column needs to be removed from the known data set 151. The mimic data set generator 110 may modify the known data set 151 directly to generate the modified version of the known data set 151, or may modify a copy of the known data set 151, for example storing the modified version of the known data set 151 as the mimic data set 153 or as an intermediary data set. After the modification is made, the mimic data set generator 110 may redetermine the statistical profile of the modified version of the known data set 151, generating the mimic statistical profile 173. The mimic data set generator 110 may then compare the mimic statistical profile 173 to the target statistical profile 172 to determine if they match. If the mimic statistical profile 173 matches the target statistical profile 172, the mimic data set generator 110 may store the modified version of the known data set 151 as the mimic data set 153. If the mimic statistical profile 173 does not match the target statistical profile 172, the mimic data set generator 110 may proceed with an additional iteration of modification, making additional modifications to the modified version of the known data set 151 and again redetermining the mimic statistical profile 173 and checking if the mimic statistical profile 173 matches the target statistical profile 172. The mimic data set generator 110 may go through as many iterations of modification as necessary until the mimic statistical profile 173 matches the target statistical profile 172.

The mimic data set generator 110 may determine how to modify the known data set 151 at each iteration of modification in any suitable manner. For example, the mimic data set generator 110 may determine the modification according to hill climbing or simulated annealing guided by, for example, the differences between the mimic statistical profile 173 and the target statistical profile 172. In some implementations, the mimic data set generator 110 may make more than one modification to the known data set 151 in an iteration of modifying the known data set 151 and determining if the modifications have resulted in the mimic statistical profile 173 matching the target statistical profile 172.

Figure 3A:
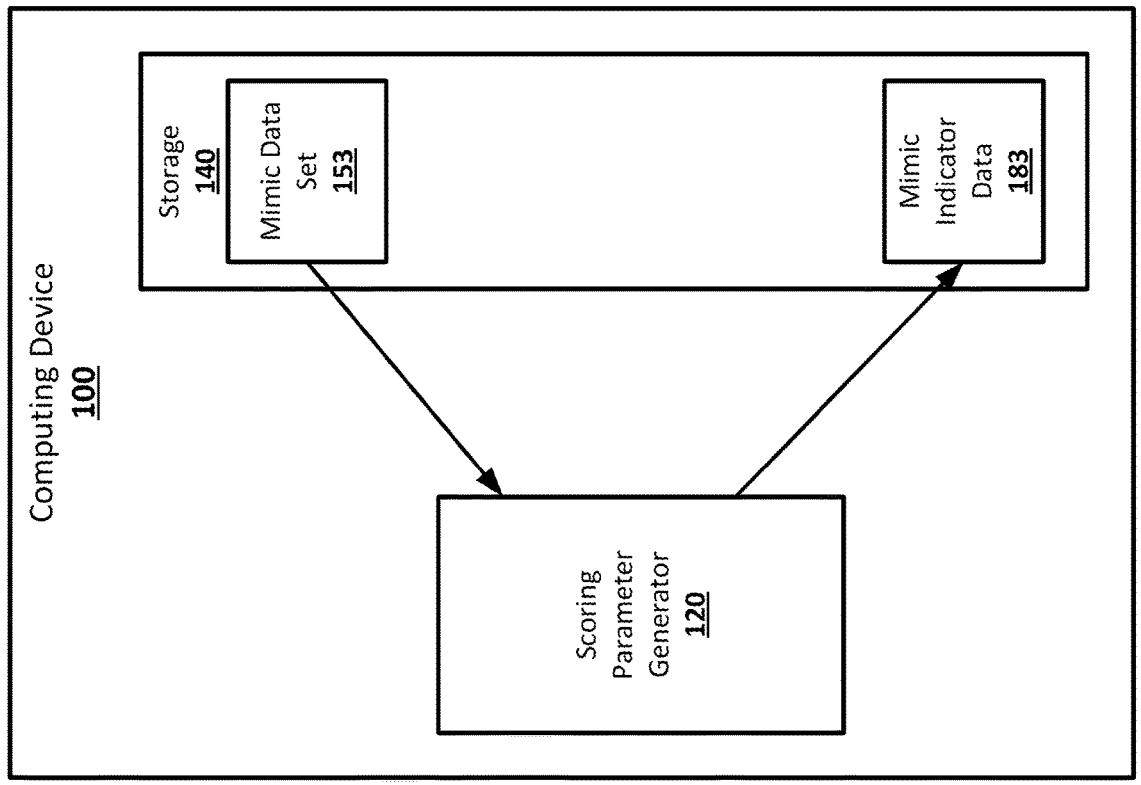
FIG. 3A shows an example arrangement suitable for scoring parameter generation for identity resolution according to an implementation of the disclosed subject matter.

FIG. 3A shows an example arrangement suitable for scoring parameter generation for identity resolution according to an implementation of the disclosed subject matter. After the mimic data set generator 110 has determined that the mimic statistical profile 173 matches the target statistical profile 172 and stored the modified version of the known data set 151 as the mimic data set 153, the mimic data set 153 may be used to generate the new scoring parameters 163 for use in generating identity resolution scores for the target data set 152. The scoring parameter generator 120 may generate the mimic indicator data 183 from the records of the mimic data set 153 by determining, for each unique pair of records in the mimic data set 153 and each column in the records, whether the values stored in the column for the same feature in each record of the pair of records match or are close enough, for example, do not differ by more than the threshold amount for the feature of that column. For example, if the mimic data set 153 has 100 records, the mimic indicator data 183 may have 4950 records, one for each unique pair of records from the mimic data set 153.

The mimic indicator data 183 may be generated and stored in any suitable format, and may, for example, be a data set of records with twice as many columns as the records of the mimic data set 153, with binary values stored in each column of a record of the mimic indicator data 183. Each column of the mimic data set 153 may have a pair of corresponding columns in the records of the mimic indicator data 183. A first of the pair of columns may store a binary value indicating whether the values in the columns of the pair of records from the mimic data set 153 that the pair of columns correspond to matches. A second of the pair of columns may store a binary value indicating whether the values in the columns of the pair of records from the mimic data set 153 that the pair of columns corresponds to are close enough to each other. For example, records in the mimic data set 153 may include a "name" column. Records in the mimic indicator data 183 may include two columns that correspond to the "name" column of the mimic data set 153. The first of the pair may be a "name matches" column, and the second of the pair may be a "name is close" column. A record in the mimic indicator data set 183 that is for a pair of records from the mimic data set 153 may have a "1" in the "name matches" column when the pair of records from the mimic data set 153 have the exact same value in their "name" columns, and "0" otherwise. The record in the mimic indicator data set 183 that is for the pair of records from the mimic data set 153 may have a "1" in the "name is close" column when the pair of records from the mimic data set 153 have values in their "name" columns that do not match exactly but differ by less than some threshold amount for names, and "0" otherwise.

Figure 3B:
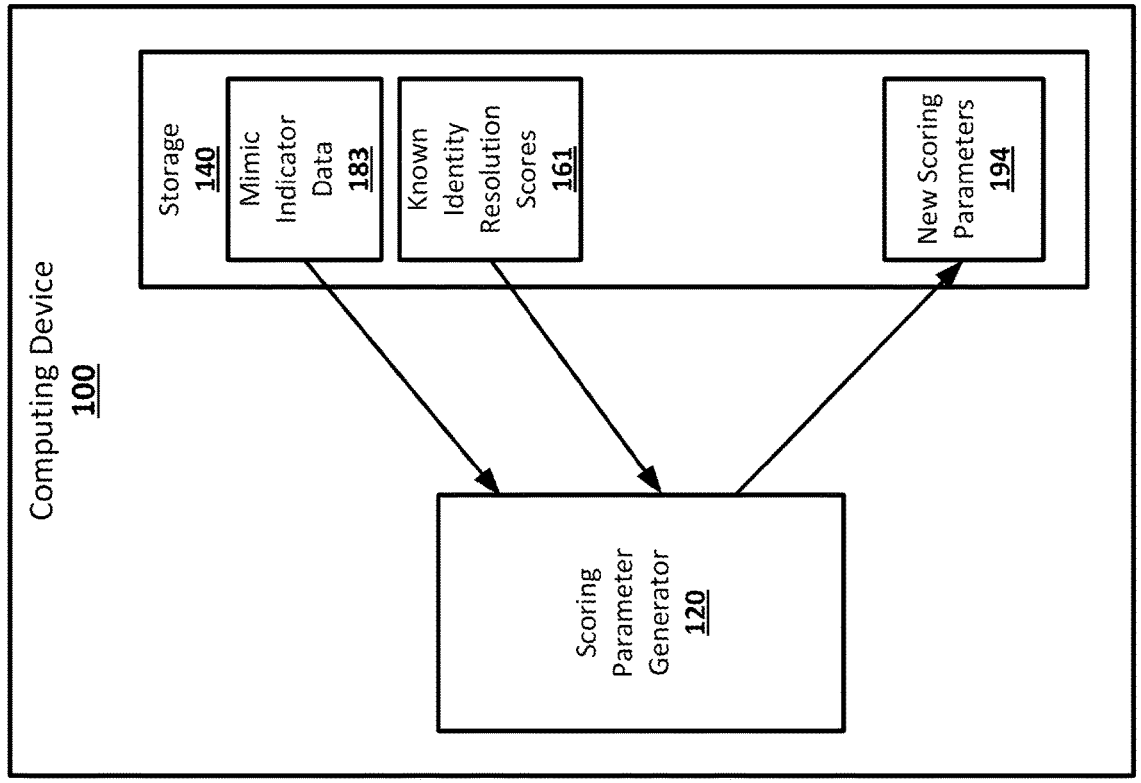
FIG. 3B shows an example arrangement suitable for scoring parameter generation for identity resolution according to an implementation of the disclosed subject matter.

FIG. 3B shows an example arrangement suitable for scoring parameter generation for identity resolution according to an implementation of the disclosed subject matter. The scoring parameter generator 120 may use the mimic indicator data 183 and the known identity resolution scores 161 to generate the new scoring parameters 194. The records in the mimic indicator data 183 may have matching identity resolution scores in the known identity resolution scores 161. Each record in the mimic indicator data 183 may correspond to a unique pair of records from the mimic data set 153, which may in turn correspond to a unique pair of records from the known data set 151, as the records in the mimic data set 153 may all be exact copies or modified copies of records from the known data set 151. The identity resolution score from the known identity resolution scores 161 for a unique pair of records from the known data set 151 may be used as the identity resolution score for the corresponding pair of records from the mimic data set 153 and may be the matching identity resolution score for the corresponding record in the mimic indicator data 183 for that pair of records from the mimic data set 153.

The scoring parameter generator 120 may use the mimic indicator data 183 and the known identity resolution scores 161 to generate equations according to equation (4) for each record in the mimic indicator data 183. The scoring parameter generator 120 may then perform any suitable regression to generate the new scoring parameters 194, which may be penalty factors that may be used with equation (4), from the equations according to equation (4). An equation according to equation (4) may be generated for a record from the mimic indicator data 183 by, for example, setting P(match) to the identity resolution score matched to the record from the mimic indicator data 183, and determining which of the penalty factors should be applied in the equation based on the values in the columns of the record from the mimic indicator data 183 that correspond to the features represented by the penalty factors. For example, a penalty factor for "name", $P_{name}$, may be applied in an equation generated for a record from the mimic indicator data 183 when both the "name matches" and "name is close" columns of that record have a value of "0", and may not be applied when one of the columns has a value of "1". The scoring parameter generator 120 may also log transform the equations according to equation (1) according to equations (2), (3), and (4), to allow the soring parameter generator 120 to perform regression on the equations generated for the records of the mimic indicator data 183. The scoring parameter generator 120 may use any suitable form of regression, including any form of linear regression, to determine values for the new scoring parameters 194. The values for the new scoring parameters 194 may be, for example, values determined for the penalty factors of equation (1) through regression on equation (4) using the mimic indicator data 183. The new scoring parameters 194 may be stored, for example, in the storage 140.

Figure 4A:
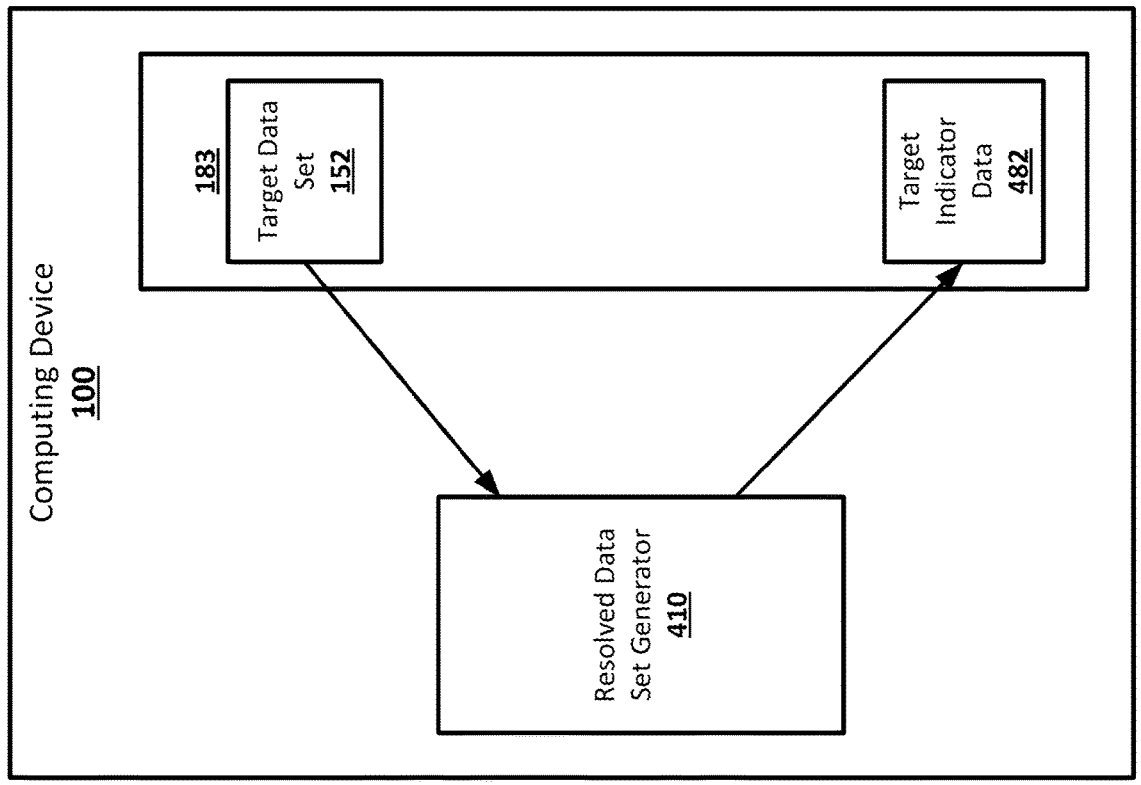
FIG. 4A shows an example arrangement suitable for scoring parameter generation for identity resolution according to an implementation of the disclosed subject matter.

FIG. 4A shows an example arrangement suitable for scoring parameter generation for identity resolution according to an implementation of the disclosed subject matter. After the scoring parameter generator 120 has generated the new scoring parameters 194, the new scoring parameters 194 may be used to perform identity resolution on the target data set 152. Identity resolution may be performed on the target data set 152 by, for example, the resolved data set generator 410. The resolved data set generator 410 may be any suitable combination of hardware and software for performing identity resolution on a data set. The resolved data set generator 410 may generate target indicator data 482 from the target data set. The target indicator data 482 may be generated in a manner similar to the generation of the mimic indicator data 183, for example, generating a record for each pair of unique records for the target data set 152, with the record storing binary values indicating whether the values in each of the columns common to the records from the target data set 152 match or are close enough, for example, differ by less than a threshold amount for the feature of the column.

Figure 4B:
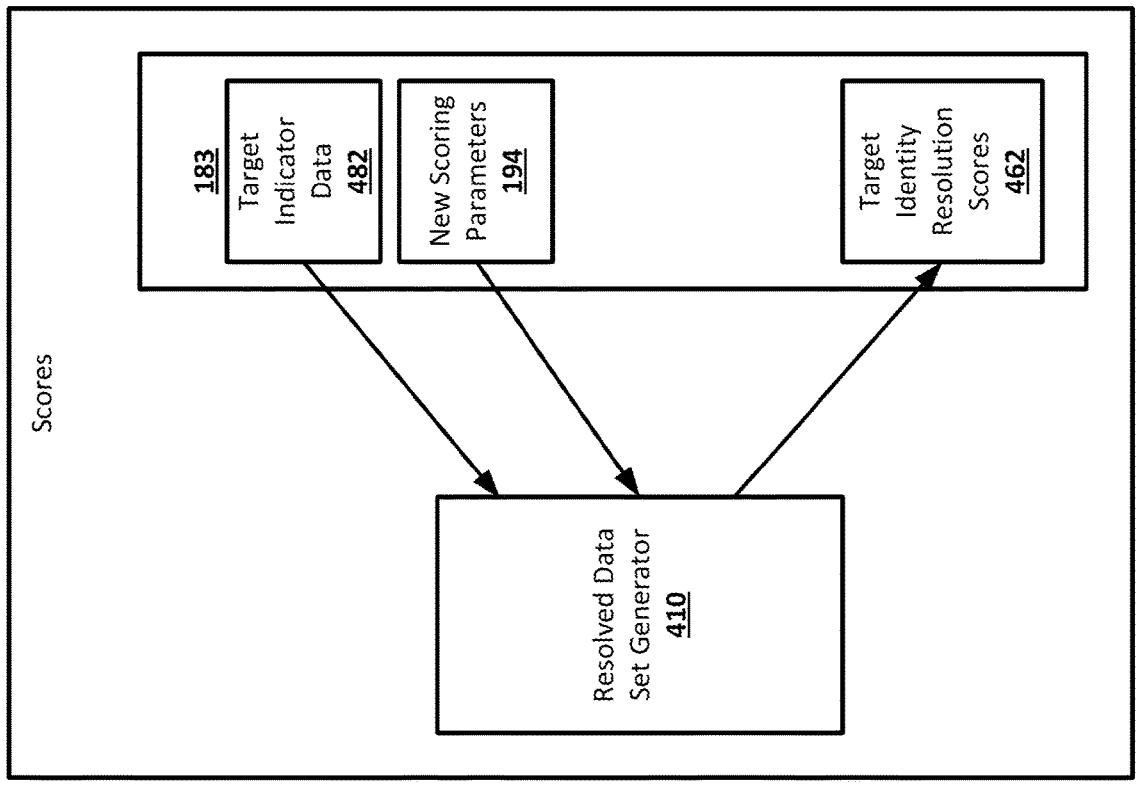
FIG. 4B shows an example arrangement suitable for scoring parameter generation for identity resolution according to an implementation of the disclosed subject matter.

FIG. 4B shows an example arrangement suitable for scoring parameter generation for identity resolution according to an implementation of the disclosed subject matter. The resolved data set generator 410 may use the target indicator data 482 and the new scoring parameters 194 to generate target identity resolution scores 462, which may be identity resolution scores for the target data set 152. The resolved data set generator 410 may, for each of the records in the target indicator data 482, use the values from that record and the new scoring parameters 194 with equation (1) to determine a value for P(match). The value of P(match) for a record from the target indicator data 482 may indicate the likelihood that the pair of unique records corresponding to the record from the target indicator data 482 store data about the same individual, and may be in the form of a probability, between 0% and 100%, or may be a score on any other suitable scale. The value of P(match) determined for a record from the target indicator data 482 may be the identity resolution score for the unique pair of records from the target data set 152 that were used to generate the record in the target indicator data 482, and may be stored with the target identity resolution scores 462. The target identity resolution scores 462 may be used in any suitable manner. For example, pairs of records from the target data set 152 with identity resolution scores above a threshold value may be combined, for example, in a resolved data set, so that the resolved data set has only one record for each unique individual with data stored in the target data set 152, as determined according to the identity resolution scores 462. Any number of records from the target data set 152 may be combined into a single record in the resolved data set based on the identity resolution scores for those pairs of records. For example, if a first record and second record of the target data set 152 have an identity resolution score above the threshold value, and the second record and a third record of the target data set 152 have an identity resolution score above the threshold value, the first record, second record, and third records may be combined into a single record in the resolved data set, as they may all store data about the same individual.

FIG. 5 shows example tables suitable for scoring parameter generation for identity resolution according to an implementation of the disclosed subject matter. A data set 501 may be a known data set, such as the known data set 151. The data set 501 may include records which store data about individuals. Each record may have a column for a record ID that identifies the record, and columns for the data about the individual, for example, an email address column and a name column. A statistical profile 502 for the data set 501 may be a statistical profile such as, for example, the known statistical profile 171. The statistical profile 502 may store data indicating the percentages of invalid data in the columns of the records of the data set 501 that store data about individuals based on the total number of unique examples of data in those columns. For example, the email address column of record IDs 6 and 7 of the data set 501 may have invalid data, and record IDs 1 and 3 may have the same valid data, resulting in an invalidity percentage of 2/6=33.33%. The name column of record ID 4 may have invalid data, and record IDs 2 and 5 may have the same valid data, resulting in invalidity percentage of 1/6=16.67%.

FIG. 6 shows an example table suitable for scoring parameter generation for identity resolution according to an implementation of the disclosed subject matter. The data set 501 may have previously had identity resolution performed on it. Indicator data 601 may have been generated for the data set 501, and the scoring of the records in the indicator data 601 for pairs of records from the data set 501 may have been performed according to equation (1), using known scoring parameters, for example, penalty factors that had been generated in any suitable manner for use with the data set 501. The scores for the records of the indicator data 601 may be stored in a score column in the records of the indicator data 601. The score column may be, for example, the known identity resolution scores 161.

Figure 7:
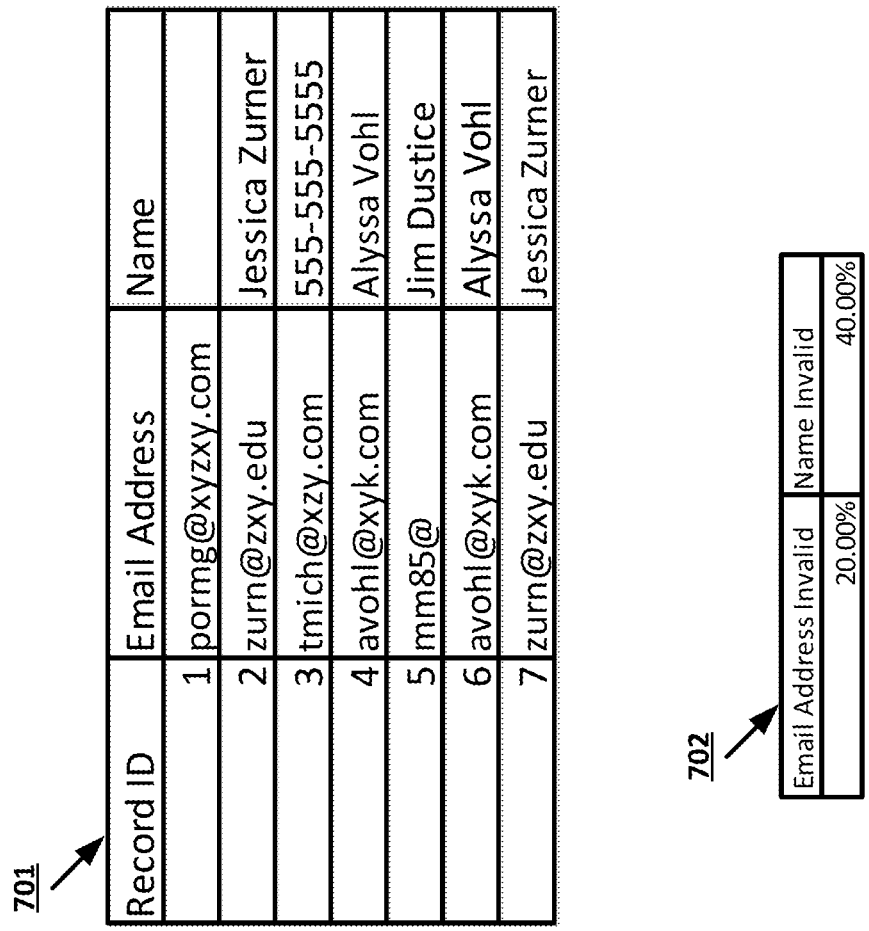
FIG. 7 shows example tables suitable for scoring parameter generation for identity resolution according to an implementation of the disclosed subject matter.

FIG. 7 shows example tables suitable for scoring parameter generation for identity resolution according to an implementation of the disclosed subject matter. A data set 701 may be a target data set, such as the target data set 152. The data set 701 may include records which store data about individuals. Each record may have a column for a record ID that identifies the record, and columns for the data about the individual, for example, an email address column and a name column. A statistical profile 702 for the data set 701 may be a statistical profile such as, for example, the target statistical profile 172. The statistical profile 702 may store data indicating the percentages of invalid data in the columns of the records of the data set 701 that store data about individuals based on the total number of unique examples of data in those columns. For example, the email address column of record ID 5 of the data set 701 may have invalid data, and record IDs 2 and 7, and 4 and 6, may have the same valid data, resulting in an invalidity percentage of 1/5=20.00%. The name column of record IDs 1 and 3 may have invalid data, and record IDs 2 and 7, and 4 and 6, may have the same valid data, resulting in invalidity percentage of 2/5=40.00%.

FIG. 8A shows example tables suitable for scoring parameter generation for identity resolution according to an implementation of the disclosed subject matter. To generate new scoring parameters, such as the new scoring parameters 194, to be used to perform identity resolution on the data set 701, the data set 501 may be modified to have a statistical profile that matches the statistical profile 702. The data set 501 may be modified until it has a statistical profile with invalidity percentages that are within 20% of the invalidity percentages of the statistical profile 702, for example, an invalidity percentage for email addresses that is between 16% and 24%, and an invalidity percentage for names that is between 32% and 48%.

The data set 501 may be modified iteratively. The first modification to the data set 501 may be the removal of valid data from the name column of record ID 6, generating a modified data set 801. The removal of valid data from the name column may increase the percentage of invalid data in the name column of the modified data set 801 to 33.33% as compared to the data set 501, which may have had a percentage of invalid data in the name column of 16.67%. A statistical profile 802 may be a statistical profile for the modified data set 801, which may be determined after the modification to the data set 501 generates the modified data set 801. The statistical profile 802 may be compared to the statistical profile 702 for the target data set 701 to determine if they match. The percentage of invalid data for the name column of the modified data set 801 at 33.33% may be within 20% of the invalidity percentage of 40% for the name column of the target data set 701, but the percentage of invalid data for the email address column of the modified data set 801 at 33.33% may not be within 20% of the invalidity percentage of 20% of the email address column of the target data set 701. This may indicate that the modified data set 801 needs to be further modified.

Figure 8B:
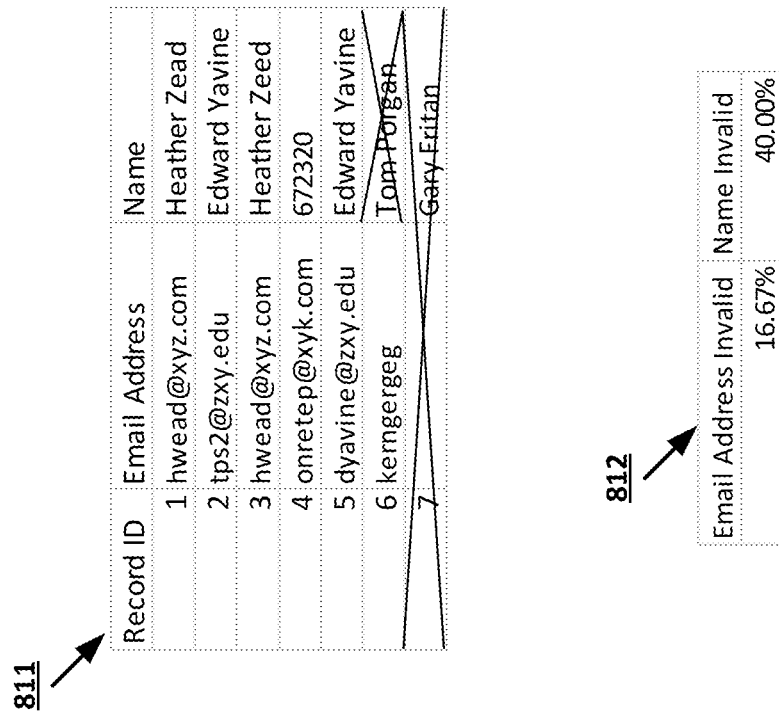
FIG. 8B shows example tables suitable for scoring parameter generation for identity resolution according to an implementation of the disclosed subject matter.

FIG. 8B shows example tables suitable for scoring parameter generation for identity resolution according to an implementation of the disclosed subject matter. The modified data set 801 may be modified through, for example, a second modification to the data set 501. The modification to the data set 501 may be the removal of the entire record ID 7 that includes invalid data in the email address column, generating a modified data set 811. The removal of a record with invalid data in the email address column may decrease the percentage of invalid data in the name column of the modified data set 811 to 16.67% as compared to the data set 501 and the modified data set 801, which may have had a percentage of invalid data in the email address column of 33.33%. The percentage of invalid data in the name column may also change from 33.33% to 40%, as the removal of record ID 6 may have also removed valid data from the name column of the modified data set 811. A statistical profile 812 may be a statistical profile for the modified data set 811, which may be determined after the modification to the data set 501 generates the modified data set 811. The statistical profile 812 may be compared to the statistical profile 702 for the target data set 701 to determine if they match. The percentage of invalid data for the name column of the modified data set 811 at 40.00% may be within 20% of the invalidity percentage of 40% for the name column of the target data set 701 and the percentage of invalid data for the email address column of the modified data set 811 at 16.67% may be within 20% of the invalidity percentage of 20% of the email address column of the target data set 701. This may indicate that the modified data set 811 does not need further modification, and may be used as a mimic data set, such as, for example, the mimic data set 153. The statistical profile 812 may be, for example, the mimic statistical profile 173.

Figure 9:
FIG. 9 shows an example table suitable for scoring parameter generation for identity resolution according to an implementation of the disclosed subject matter.

FIG. 9 shows an example table suitable for scoring parameter generation for identity resolution according to an implementation of the disclosed subject matter. Scores from the data set 501 may be matched to indicator data 901, which may be generated for the modified data set 811. The indicator data 901 may be, for example, the mimic indicator data 813. Each record in the indicator data 901 may correspond to a record in the indicator data 601. For example, the record ID 8 from the indicator 901 may correspond to the record ID 9 from the indicator data 601, as both may be indicator data for the pair of records from data set 501 and the modified data set 811, or mimic data set, with records IDs 2 and 5, which may be corresponding records across both data sets. The score for the record ID 9 from the indicator data 601 may be matched to and stored as the score for the record ID 8 from the indicator data 901.

The scores matched to the records of the indicator data 901 from the indicator data 601 may be used in conjunction with the indicator data 901 to generate an equation, for example, according to equation (4), on which regression may be performed to generate new scoring parameters, such as the new scoring parameters 194. Equation (1) may be log transformed and divided through by any hardcoded values for penalty factors, for example, according to equations (2), (3), and (4), before regression is performed. The regression may be any suitable form of regression, including any suitable form of linear regression. The new scoring parameters 194 may then be used, for example, with equation (1), to generate scores for identity resolution for the data set 601, which may be the target data set 152. The new scoring parameters 194 may have been generated automatically and may be generated more quickly and with less human effort than other procedures used to generate scoring parameters, while still providing accurate identity resolution. This may allow for the faster generation of scoring parameters and faster and more accurate identity resolution on data sets with invalid data, resulting in more efficient use of computational resources, including processing and storage, when performing identity resolution and storing data sets that have been subjected to identity resolution.

Figure 10:
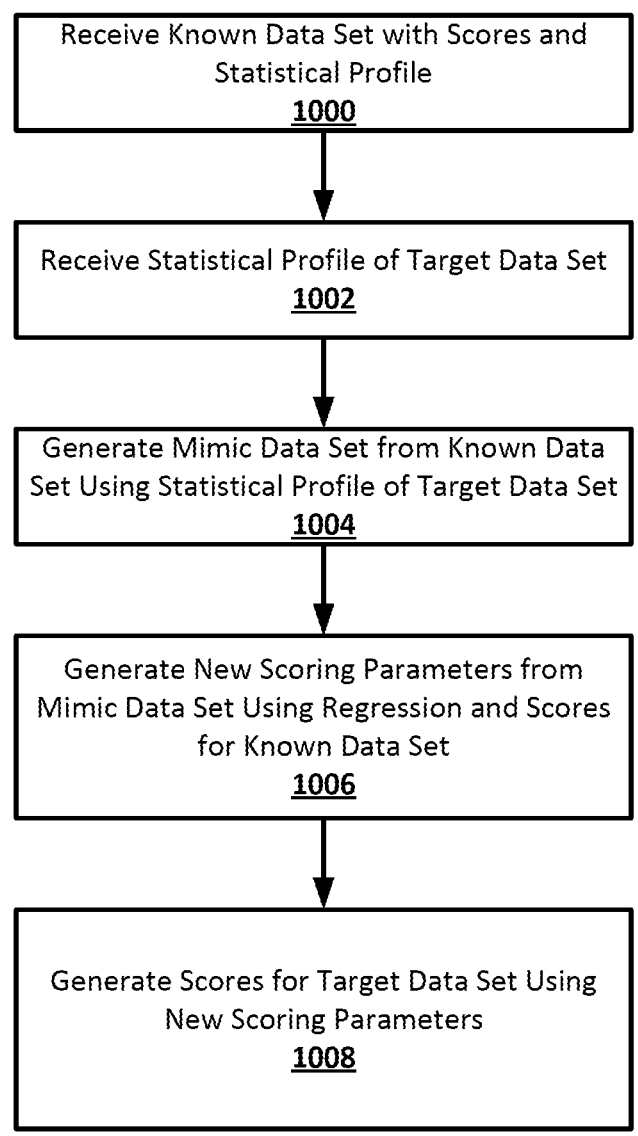
FIG. 10 shows an example procedure suitable for scoring parameter generation for identity resolution according to an implementation of the disclosed subject matter.

FIG. 10 shows an example procedure suitable for scoring parameter generation for identity resolution according to an implementation of the disclosed subject matter. At 1000, a known data set may be received with scores and a statistical profile. The known data set with scores and statistical profile may be received from any suitable source, including any suitable storage on any local or remote computing device. For example, the mimic data set generator 110 may receive the known data set 151, the known identity resolution scores 161, and the known statistical profile 171 from the storage 140 of the computing device 100.

At 1002, a statistical profile of a target data set may be received. The statistical profile of the target data set may be received from any suitable source, including any suitable storage on any local or remote computing device. The target data set for which the statistical profile is received may be a data set for which new scoring parameters for performing identity resolution will be generated. For example, the mimic data set generator 110 may receive the target statistical profile 172 from the storage 140 of the computing device 100.

At 1004, a mimic data set may be generated from the known data set using the statistical profile of the target data set. For example, the mimic data set generator 110 may modify the known data set 151 through removal of unique examples of valid data from columns of records of the known data set 151 and through removal of records from the known data set 151 that have columns with invalid data. The modifications made by the mimic data set generator 110 may be done iteratively, and the mimic data set generator 110 may redetermine the statistical profile for the known data set 151 after each modification is made and then compare the statistical profile for the modified version of the known data set 151 to the target statistical profile 172. The mimic data set generator 110 may stop modifying the known data set 151 once the statistical profile of the modified version of the known data set 151, as redetermined after the most recent modification, matches the target statistical profile 172. The modified version of the known data set 151, or a copy thereof, may be stored as the mimic data set 153. The mimic data set generator 110 may also store the most recently determined statistical profile of the modified version of the known data set 151 as the mimic statistical profile 173.

At 1006, new scoring parameters may be generated from the mimic data set using regression and scores from the known data set. For example, the scoring parameter generator 120 may generate the mimic indicator data 183 from the records of the mimic data set 153. The records of the mimic indicator data 183 may be matched to scores from the known identity resolution scores 161 based on the correspondence between record pairs of records in the mimic indicator data 183 and the record pairs each of the identity resolution scores in the known identity resolution scores 161 was generated for. The mimic indicator data 183, with matched identity resolution scores, may be used to generate equations in the form of equation (4). An equation may be generated for each record in the mimic indicator data 183. The identity resolution score for a record of the mimic indicator data 183 may be used as the value for P(match), and the values in the columns of the record of the mimic indicator data 183 may be used to determine which penalty factors should be applied. The scoring parameter generator 120 may log transform the equations and divide through by any hard-coded penalty factors, for example, as according to equations (2), (3), and (4), and then perform any suitable form of regression, including linear regression, on equation (4), using the identity resolution scores and the mimic indicator data 183, to generate values for the penalty factors. The scoring parameter generator 120 may store the generated values for the penalty factors as the new scoring parameters 194.

At 1008, scores for the target data set may be generated using the new scoring parameters. For example, indicator data may be generated from the target data set 152. The indicator data generated for the target data set 152 may be used as input to a scoring equation, for example, equation (1), along with the new scoring parameters 194, which may be, for example penalty factors for use with equation (1). The scoring equation, for example, equation (1), may be used to generate an identity resolution score for each unique pair of records in the target data set 152. The identity resolution scores may be used in any suitable manner. For example, pairs of records from the target data set 152 that have an identity resolution score above a threshold value may be considered to store data about the same individual, and may be combined, or an indication that the records store data about the same individual may be stored as parts of the records, for example, in columns of the records, or as metadata for the records stored separately from the records. The identity resolution scores may allow, for example, for the target data set 152 to be reduced in size through combination of records that store data about the same individual, reducing the storage needed for the target data set 152, bandwidth needed to transmit the target data set 152 over any communications network, the computational resources, such as volatile memory and processor time, needed to perform database operations on the target data set 152, and the bandwidth and computational resources need to send communications to individuals with records in the target data set 152. The indicator data generated from the target data set 152 may be generated by any suitable component of the computing device 100, and any suitable component of the computing device 100 may generate the identity resolution scores using the indicator data generated from the target data set 152 and the new scoring parameters 194.

Figure 11:
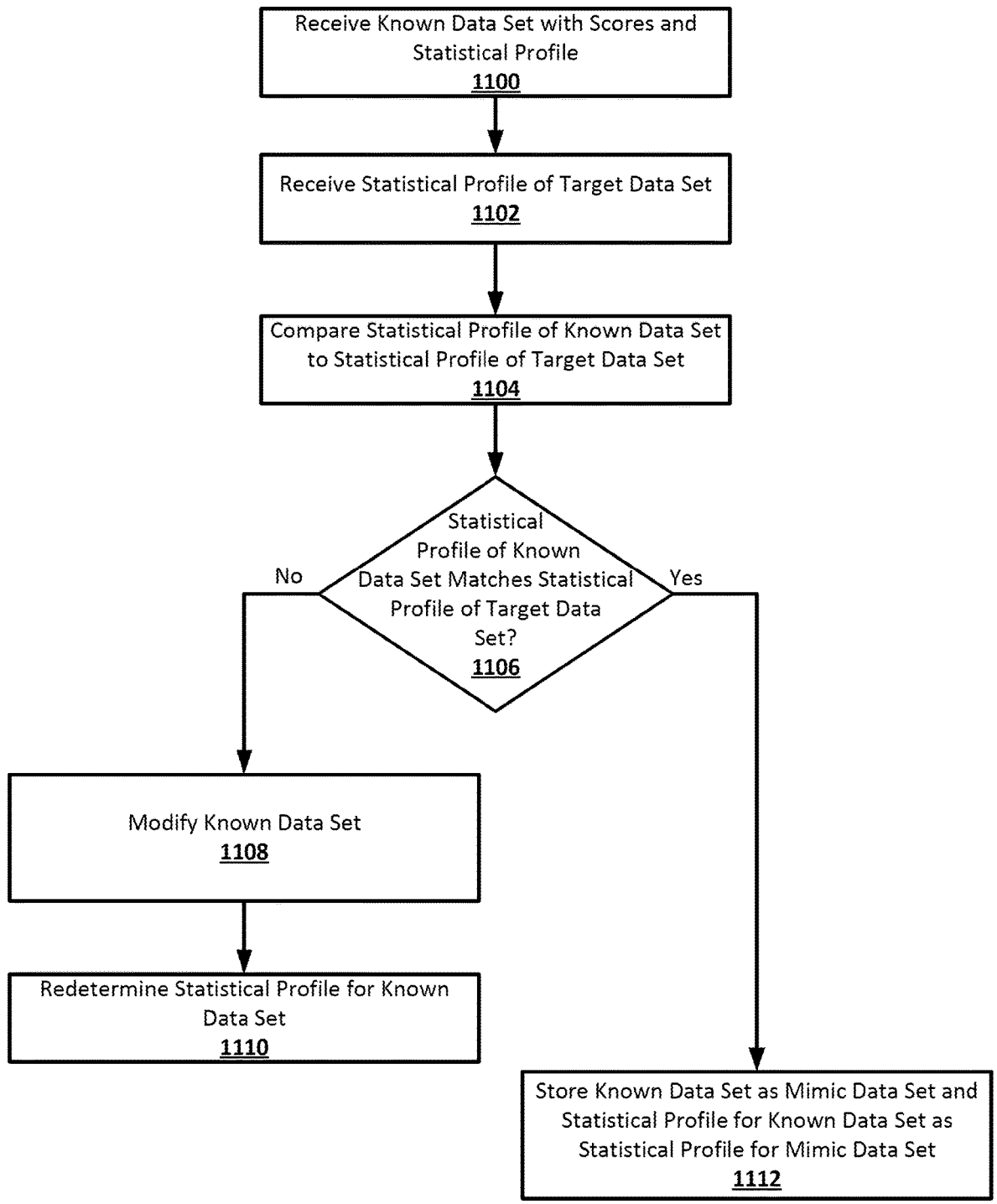
FIG. 11 shows an example procedure suitable for scoring parameter generation for identity resolution according to an implementation of the disclosed subject matter.

FIG. 11 shows an example procedure suitable for scoring parameter generation for identity resolution according to an implementation of the disclosed subject matter. At 1100, a known data set may be received with scores and a statistical profile. The known data set with scores and statistical profile may be received from any suitable source, including any suitable storage on any local or remote computing device. For example, the mimic data set generator 110 may receive the known data set 151, the known identity resolution scores 161, and the known statistical profile 171 from the storage 140 of the computing device 100.

At 1102, a statistical profile of a target data set may be received. The statistical profile of the target data set may be received from any suitable source, including any suitable storage on any local or remote computing device. The target data set for which the statistical profile is received may be a data set for which new scoring parameters for performing identity resolution will be generated. For example, the mimic data set generator 110 may receive the target statistical profile 172 from the storage 140 of the computing device 100.

At 1104, the statistical profile of the target data set and statistical profile may be compared. For example, the mimic data set generator 110 may compare the percentages of invalid data in the columns of the known data set 151, as indicated in the known statistical profile 171, with the percentage of invalid data in the columns of the target data set 152, as indicated in the target statistical profile 172. The percentages of invalid data may be compared across corresponding columns that are common between the known data set 151 and the known data set 152, for example, columns that store data for the same feature as indicated by, for example, labels for the columns or database schema for the data sets.

At 1106, if the statistical profile of the known data set matches the statistical profile of the target data set, flow may proceed to 1112, otherwise flow may proceed to 1108. For example, the known statistical profile 171 may match the target statistical profile 172 when, during comparison, the mimic data set generator 110 determines that the percentage of invalid data in each column of the known data set 151, as indicated by the known statistical profile 171, is within some threshold percentage of the percentage of invalid data in the corresponding column of the target data set 152, as indicated in the target statistical profile 172. The threshold percentage may be any suitable percentage and may be set in any suitable manner.

At 1108, a modification may be made to the known data set. For example, mimic data set generator 110 may have determined that the known statistical profile 152 does not match the target statistical profile 152. The mimic data set generator 110 may modify the known data set 151 by removing all occurrences of a unique example of valid data from the same column of each record of the known data set 151 in which the unique example is stored, or by removing an entire record that includes invalid data from known data set 151. Occurrences of a unique example of valid data may be removed from the same column of each record of the known data set 151 in which the unique example is stored in order to increase the percentage of invalid data in that column in the known data set 151. A record with invalid data may be removed to decrease the percentage of invalid data in the column of the record that stored the invalid data, though other columns may their percentages of invalid data increased or decreased depending on the validity of data in other columns of the record. Records may be selected for removal at random from among records that have invalid data in a column that needs its percentage of invalid data to be decreased. The mimic data set generator 110 may determine what modification to make in any suitable manner. For example, the mimic data set generator 110 may implement any suitable form of hill-climbing or simulated annealing with a goal of making the known statistical profile 151 match the target statistical profile 172 to determine what modification to make to the known data set 151.

At 1110, the statistical profile for the known data set may be redetermined. For example, the mimic data set generator 110 may redetermine the known statistical profile 171 after modifying the known data set 151. The mimic data set generator 110 may recalculate the percentage of invalid data in each of the columns of the known data set 151, taking into account any modifications that mimic data set generator 110 has already made to the known data set 151. Flow may then proceed back to 1204.

At 1112, the known data set may be stored as the mimic data set and the statistical profile for the known data set may be stored as the statistical profile for the mimic data set. For example, the mimic data set generator 110 may have determined, after performing a comparison, that the known statistical profile 171 matches the target statistical profile 172. The mimic data set generator 110 may store the known data set 151, with any modifications made by the mimic data set generator 110, as the mimic data set 153. The mimic data set generator 110 may also store the known statistical profile 171, as redetermined based on modification to the known data set 151, as the mimic statistical profile 173. The mimic data set 153 and the mimic statistical profile 173 may be stored in any suitable storage on any suitable local or remote computing device, such as, for example, the storage 140 of the computing device 100.

Figure 12:
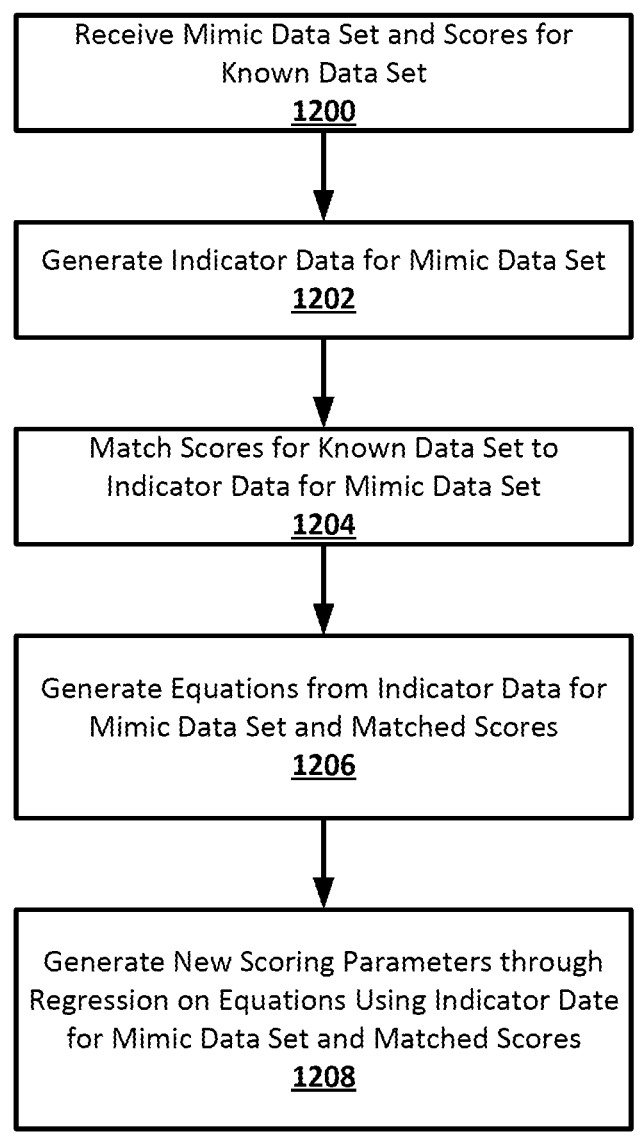
FIG. 12 shows an example procedure suitable for scoring parameter generation for identity resolution according to an implementation of the disclosed subject matter.

FIG. 12 shows an example procedure suitable for scoring parameter generation for identity resolution according to an implementation of the disclosed subject matter. At 1200, a mimic data set and scores for a known data set may be received. The mimic data set and scores for the known data may be received from any suitable source, including any suitable storage on any local or remote computing device. For example, the scoring parameter generator 120 may receive the mimic data set 153 and the known identity resolution scores 161, from the storage 140 of the computing device 100. The scores for the known data set may be identity resolution scores for the known data set that was modified to generate the mimic data set. For example, the mimic data set 153 may have been generated through modification of the known data set 151, so the known identity resolution scores 161 may be received by scoring parameter generator 120 along with mimic data set 153.

At 1202, indicator data may be generated for the mimic data set. For example, the mimic indicator data 183 may be generated by the scoring parameter generator 120 for the mimic data set 153. The mimic indicator data 183 may be, for example, a data set that includes a record for each unique pair of record from the mimic data set 153. The columns of a record of the mimic indicator data 183 for a unique pair of records from the mimic data set 153 may include values, for example, binary values, that indicate whether the values stored in columns common between the unique pair of record from the mimic data set 153 match, or differ by less than some threshold amount.

At 1204, scores for the known data set may be matched to the indicator data for the mimic data set. For example, identity resolution scores for unique pairs of records from the known data set 151 from the known identity resolution scores 161 may be matched, by, for example, the scoring parameter generator 120, to the records of the mimic indicator data 183 that are for the same unique pairs of records. Every record in the mimic indicator data 183 may have a corresponding record in indicator data for the known data set 151 that may be for the same unique pair of records, as every record in the mimic data set 153 may have a counterpart record in the known data set 151. Each record in the indicator data for the known data set 151 may have had an identity resolution score generated for it and stored with the known identity resolution scores 161. The identity resolution score for a record in the indicator data for the known data set 151 may be used as the identity resolution score for that record's corresponding record in the mimic indicator data 183, as both the records may have been generated for corresponding unique pairs of records from the known data set 151 and the mimic data set 153.

At 1206, equations may be generated from the indicator data for the mimic data set and the matched scores. For example, the scoring parameter generator 120 may use the mimic indicator data 183, with matched identity resolution scores, in conjunction with equation (4). Each equation may be generated for a record in the mimic indicator data 183. The identity resolution score match to a record of the mimic indicator data 183 may be used as the value for P(match) in equation (4), and the values in the columns of the record from of the mimic indicator data 183 may be used to determine which penalty factors should be applied in equation (4). For example, if the records in the mimic data set 153 included four columns representing four features, email address, name, phone number, and physical address, then equation (4) may include a maximum of four penalty factors, each corresponding to a column from the records of the mimic data set 153. The record in the mimic indicator data 183 for a unique pair of records from the mimic data set 153 may include eight columns representing whether, for each features column common to the unique pair of records of from the mimic data set 153, the value in the columns matches, or differs by less than a threshold amount. A penalty factor may be applied in equation (1) when the data in the columns of the record of the mimic indicator data 183 indicates that the data in the columns of the unique pair of records didn't match and differed by more than the threshold. For example, if the record of the mimic indicator data 183 indicates that the data in the name column of the unique pair of records from the mimic data set 153 isn't the same, and differs by more than the threshold, than the penalty factor for name may be applied in the equation generated based on equation (1) for the record from the mimic indicator data 183.

At 1208, new scoring parameters may be generated from through regression using the indicator data for the mimic data set and matching scores. For example, the scoring parameter generator 120 may log transform the equation (1), for example, as according to equations (2), (3), and (4), and then perform any suitable form of regression, including linear regression, using the log transformed equation, equation (4) with the matches scores and mimic indicator data 183, to generate values for the penalty factors. For example, the matches scores may be used as P(match) to determine the values for the dependent variable on the left side of equation (4), and the mimic indicator data 183 may be used on the right side of equation (4) to determine which penalty factors apply to a given matched score. This may allow least squares regression to be performed on equation (4), generating values for the penalty factors. The scoring parameter generator 120 may store the values for the penalty factors generated as the new scoring parameters 194.

After being generated, the new scoring parameters 194 may be used in any suitable manner. For example, the new scoring parameters may be used to generate identity resolution scores for the target data 152, allowing for identity resolution to be performed on the target data set 152. Various performance metrics for the new scoring parameters 194 may be measured, for example, by using the new scoring parameters 194 to generate identity resolution scores for the known data set 151, using these identity resolution scores to perform identity resolution on the known data set 151 through combing pairs of records with an identity resolution score higher than a threshold value, and comparing to the known identity resolution scores 161 and the results of performing identity resolution on the known data set 151 with the identity resolution scores 161.

Figure 13:
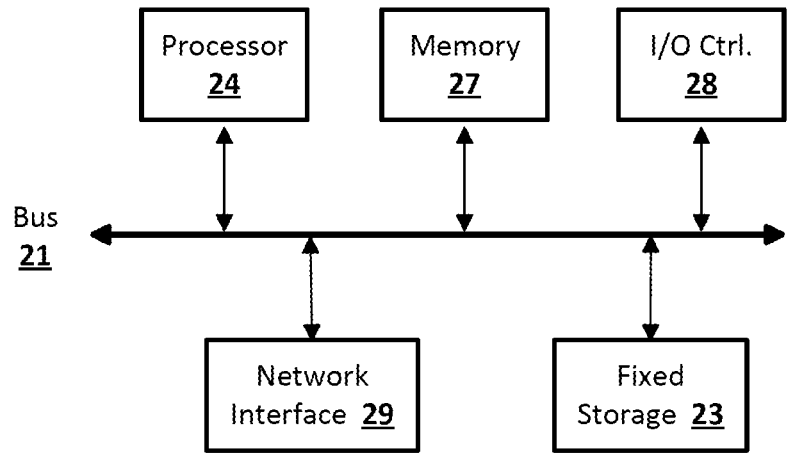
FIG. 13 shows a computer according to an embodiment of the disclosed subject matter.

Embodiments of the presently disclosed subject matter may be implemented in and used with a variety of component and network architectures. FIG. 13 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 14.

Many other devices or components (not shown) may be connected in a similar manner, such as document scanners, digital cameras, auxiliary, supplemental, or backup systems, or the like. Conversely, all of the components shown in FIG. 13 need not be present to practice the present disclosure. The components can be interconnected in different ways from that shown. The operation of a computer such as that shown in FIG. 13 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 14:
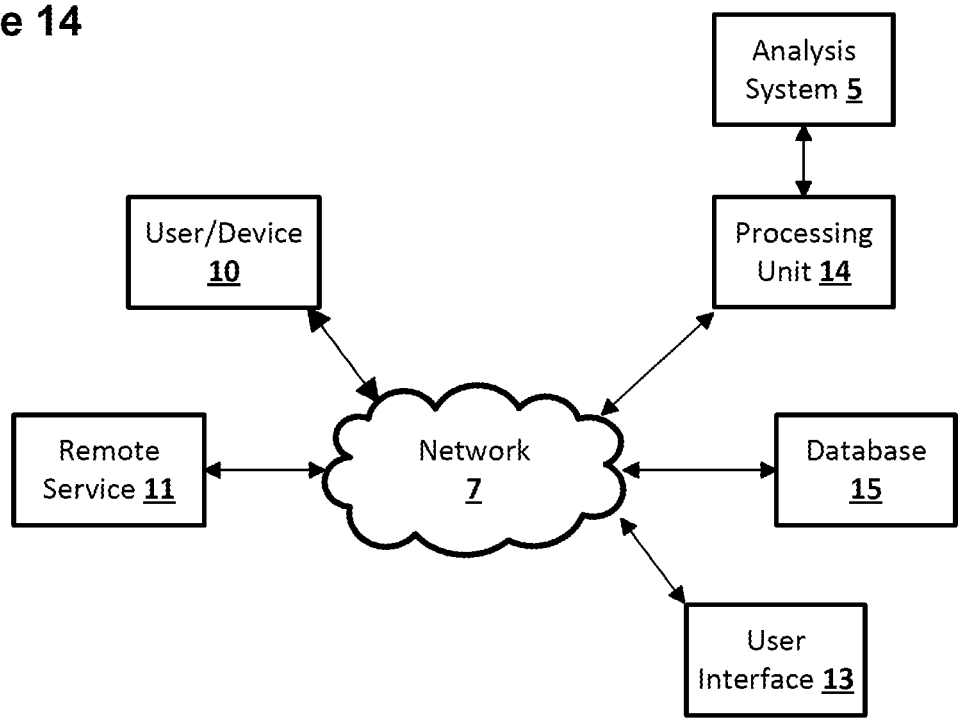
FIG. 14 shows a network configuration according to an embodiment of the disclosed subject matter.

FIG. 14 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database table 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database table 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database table 15 and/or user interface 13. In some arrangements, an analysis system 5 may provide back-end processing, such as where stored or acquired data is pre-processed by the analysis system 5 before delivery to the processing unit 14, database table 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, by a computing device, a first data set, a statistical profile of a third data set, and identity resolution scores generated for the first data set;
   generating, by the computing device, from the first data set, a second data set that has a statistical profile that matches the statistical profile of the third data set, each of the first data set, the second data set, and the third data set comprising records that comprise data about individuals;
   matching, by the computing device, the identity resolution scores generated for the first data set to pairs of records from the second data set;
   generating, by the computing device, using regression, new scoring parameters from the second data set and the identity resolution scores matched to the pairs of records from the second data set; and
   generating, by the computing device, identity resolution scores for pairs of records from the third data set using the new scoring parameters.

2. The method of claim 1, wherein generating, from the first data set, a second data set that has a statistical profile that matches the statistical profile of the third data set, each of the first data set, the second data set, and the third data set comprising records that comprise data about individuals, further comprises:
   determining based on a comparison of a statistical profile of the first data set to a statistical profile of the second data set that the statistical profile of the first data set does not match the statistical profile of the second data set; and
   in response to the determination that the statistical profile of the first data set does not match the statistical profile of the second data set, modifying the first data set by removing all occurrences of an example of valid data from the same columns of records of the first data set or removing a record with at least one column with invalid data from the first data set.

3. The method of claim 1, wherein generating, from the first data set, a second data set that has a statistical profile that matches the statistical profile of the third data set, each of the first data set, the second data set, and the third data set comprising records that comprise data about individuals, further comprises:
   determining based on a comparison of a statistical profile of the first data set to a statistical profile of the second data set that the statistical profile of the first data set matches the statistical profile of the second data set; and
   in response to the determination that the statistical profile of the first data set does matches the statistical profile of the second data set, storing a copy of the first data set as the second data set and storing a copy of the statistical profile of the first data set as the statistical profile of the second data set.

4. The method of claim 1, wherein the first data set is a known data set for which the identity resolution scores have already been generated, the second data set is a mimic data set that mimic a target data set, and the third data set is the target data set.

5. The method of claim 1, wherein matching identity resolution scores generated for the first data set to pairs of records from the second data set further comprises:
   generating indicator data from the second data set, wherein the indicator data comprises records, and wherein each of the records of the indicator data comprises values indicating whether data from common columns in a pair of records from the second data set is the same or differs by less than a threshold value for the features of the common columns;
   determining, for each one of the records in the indicator data for the second data set, from the identity resolution scores generated for the first data set, an identity resolution score that was generated for a pair of records from the first data set that correspond to the pair of records from the one of the records in the indicator data for the second data set; and
   storing each of the identity resolutions scores determined for each one of the records in the indicator data for the second data set as the identity resolution scores for the second data set.

6. The method of claim 5, wherein generating, using regression, new scoring parameters from the second data set and the identity resolution scores matched to the pairs of records from the second data set further comprises:
   generating an equation based on a scoring equation for identity resolution, the indicator data for the second data set, and the identity resolutions scores for the second data set;
   performing a log transformation on the equation to generate a log transformed equation; and
   generating new scoring parameters by performing regression on the log transformed equations.

7. The method of claim 1, further comprising combining one or more records of the third data set based on the identity resolution scores for pairs of records from the third data set.

8. The method of claim 1, wherein the new scoring parameters comprise penalty factors for use with a scoring equation.

9. A computer-implemented system comprising:
   a storage; and
   a processor that receives a first data set, a statistical profile of a third data set, and identity resolution scores generated for the first data set;
   generates, from the first data set, a second data set that has a statistical profile that matches the statistical profile of the third data set, each of the first data set, the second data set, and the third data set comprising records that comprise data about individuals,
   matches the identity resolution scores generated for the first data set to pairs of records from the second data set,
   generates, using regression, new scoring parameters from the second data set and the identity resolution scores matched to the pairs of records from the second data set, and
   generates identity resolution scores for pairs of records from the third data set using the new scoring parameters.

10. The system of claim 9, wherein the processor generates, from the first data set, a second data set that has a statistical profile that matches the statistical profile of the third data set, each of the first data set, the second data set, and the third data set comprising records that comprise data about individuals, by determining based on a comparison of a statistical profile of the first data set to a statistical profile of the second data set that the statistical profile of the first data set does not match the statistical profile of the second data set, and in response to the determination that the statistical profile of the first data set does not match the statistical profile of the second data set, modifying the first data set by removing all occurrences of an example of valid data from the same columns of records of the first data set or removing a record with at least one column with invalid data from the first data set.

11. The system of claim 9, wherein the processor generates, from the first data set, a second data set that has a statistical profile that matches the statistical profile of the third data set, each of the first data set, the second data set, and the third data set comprising records that comprise data about individuals, by determining based on a comparison of a statistical profile of the first data set to a statistical profile of the second data set that the statistical profile of the first data set matches the statistical profile of the second data set, and in response to the determination that the statistical profile of the first data set does matches the statistical profile of the second data set, storing a copy of the first data set as the second data set and storing a copy of the statistical profile of the first data set as the statistical profile of the second data set.

12. The system of claim 9, wherein the first data set is a known data set for which the identity resolution scores have already been generated, the second data set is a mimic data set that mimic a target data set, and the third data set is the target data set.

13. The system of claim 9, wherein the processor matches identity resolution scores generated for the first data set to pairs of records from the second data set by generating indicator data from the second data set, wherein the indicator data comprises records, and wherein each of the records of the indicator data comprises values indicating whether data from common columns in a pair of records from the second data set is the same or differs by less than a threshold value for the features of the common columns, determining, for each one of the records in the indicator data for the second data set, from the identity resolution scores generated for the first data set, an identity resolution score that was generated for a pair of records from the first data set that correspond to the pair of records from the one of the records in the indicator data for the second data set, and storing each of the identity resolutions scores determined for each one of the records in the indicator data for the second data set as the identity resolution scores for the second data set.

14. The system of claim 13, wherein the processor generates, using regression, new scoring parameters from the second data set and the identity resolution scores matched to the pairs of records from the second data set by generating an equation based on a scoring equation for identity resolution, the indicator data for the second data set, and the identity resolutions scores for the second data set, performing a log transformation on the equation to generate a log transformed equation, and generating new scoring parameters by performing regression on the log transformed equations.

15. The system of claim 9, further wherein the processor further combines one or more records of the third data set based on the identity resolution scores for pairs of records from the third data set.

16. The system of claim 9, wherein the new scoring parameters comprise penalty factors for use with a scoring equation.

17. A system comprising: one or more computers and one or more storage devices storing instructions which are operable, when executed by the one or more computers, to cause the one or more computers to perform operations comprising:

receiving, by a computing device, a first data set, a statistical profile of a third data set, and identity resolution scores generated for the first data set;

generating, from the first data set, a second data set that has a statistical profile that matches the statistical profile of the third data set, each of the first data set, the second data set, and the third data set comprising records that comprise data about individuals;

matching the identity resolution scores generated for the first data set to pairs of records from the second data set;

generating, using regression, new scoring parameters from the second data set and the identity resolution scores matched to the pairs of records from the second data set; and generating identity resolution scores for pairs of records from the third data set using the new scoring parameters.

18. The system of claim 17, wherein the instructions which are operable, when executed by the one or more computers, to cause the one or more computers to perform operations comprising generating, from the first data set, a second data set that has a statistical profile that matches the statistical profile of the third data set, each of the first data set, the second data set, and the third data set comprising records that comprise data about individuals, further comprise instructions which are operable, when executed by the one or more computers, to cause the one or more computers to perform operations comprising:

determining based on a comparison of a statistical profile of the first data set to a statistical profile of the second data set that the statistical profile of the first data set does not match the statistical profile of the second data set; and in response to the determination that the statistical profile of the first data set does not match the statistical profile of the second data set, modifying the first data set by removing all occurrences of an example of valid data from the same columns of records of the first data set or removing a record with at least one column with invalid data from the first data set.

19. The system of claim 17, wherein the instructions which are operable, when executed by the one or more computers, to cause the one or more computers to perform operations comprising generating, from the first data set, a second data set that has a statistical profile that matches the statistical profile of the third data set, each of the first data set, the second data set, and the third data set comprising records that comprise data about individuals, further comprise instructions which are operable, when executed by the one or more computers, to cause the one or more computers to perform operations comprising:

determining based on a comparison of a statistical profile of the first data set to a statistical profile of the second data set that the statistical profile of the first data set matches the statistical profile of the second data set; and in response to the determination that the statistical profile of the first data set does matches the statistical profile of the second data set, storing a copy of the first data set as the second data set and storing a copy of the statistical profile of the first data set as the statistical profile of the second data set.

20. The system of claim 17, wherein the instructions which are operable, when executed by the one or more computers, to cause the one or more computers to perform operations comprising matching identity resolution scores generated for the first data set to pairs of records from the second data set, further comprise instructions which are operable, when executed by the one or more computers, to cause the one or more computers to perform operations comprising:
- generating indicator data from the second data set, wherein the indicator data comprises records, and wherein each of the records of the indicator data comprises values indicating whether data from common columns in a pair of records from the second data set is the same or differs by less than a threshold value for the features of the common columns;
- determining, for each one of the records in the indicator data for the second data set, from the identity resolution scores generated for the first data set, an identity resolution score that was generated for a pair of records from the first data set that correspond to the pair of records from the one of the records in the indicator data for the second data set; and
- storing each of the identity resolutions scores determined for each one of the records in the indicator data for the second data set as the identity resolution scores for the second data set.

21. The system of claim 20, wherein the instructions which are operable, when executed by the one or more computers, to cause the one or more computers to perform operations comprising generating, using regression, new scoring parameters from the second data set and the identity resolution scores matched to the pairs of records from the second data set further comprise instructions which are operable, when executed by the one or more computers, to cause the one or more computers to perform operations comprising:
- generating an equation based on a scoring equation for identity resolution, the indicator data for the second data set, and the identity resolutions scores for the second data set;
- performing a log transformation on the equation to generate a log transformed equation; and
- generating new scoring parameters by performing regression on the log transformed equations.

* * * * *